(12) United States Patent
Imai

(10) Patent No.: US 7,440,702 B2
(45) Date of Patent: Oct. 21, 2008

(54) METHOD FOR TRANSMITTING DIGITAL IMAGE SIGNAL, DIGITAL IMAGE TRANSMITTING DEVICE, DIGITAL IMAGE SENDING DEVICE AND DIGITAL IMAGE RECEIVER

(75) Inventor: Nobuyuki Imai, Shjuziri (JP)

(73) Assignee: Seiko Epson Corporation (JP)

( * ) Notice: Subject to any disclaimer, the term of this patent is extended or adjusted under 35 U.S.C. 154(b) by 683 days.

(21) Appl. No.: 10/914,717

(22) Filed: Aug. 9, 2004

(65) Prior Publication Data
US 2005/0063707 A1   Mar. 24, 2005

(30) Foreign Application Priority Data
Aug. 7, 2003 (JP) ............................. 2003-289037
Mar. 1, 2004 (JP) ............................. 2004-056186

(51) Int. Cl.
H04B 10/12 (2006.01)

(52) U.S. Cl. ...................... 398/141; 398/140; 398/154; 398/155; 398/156; 398/158; 398/159; 398/162; 398/182; 398/183; 398/186; 398/192; 398/193; 398/194; 398/202; 398/208; 398/214; 398/200; 398/42; 398/79; 398/135; 398/136; 398/137; 398/138; 398/139; 348/725; 348/723; 348/557; 348/571; 348/359; 348/500; 348/536; 348/537; 348/488; 341/100; 341/101; 345/87; 345/204; 345/698; 725/147; 725/121; 725/127; 725/129; 385/100

(58) Field of Classification Search ................. 398/155, 398/154, 79, 158, 159, 135, 164, 141, 182, 398/202, 208, 214, 190, 191, 192, 193, 194, 398/140, 156, 162, 183, 186, 200, 136, 137, 398/138, 139, 42; 385/100; 345/87, 204, 345/698; 341/100, 101; 348/359, 500, 536, 348/488, 537, 725, 723, 557, 571; 725/147, 725/121, 127, 129
See application file for complete search history.

(56) References Cited

U.S. PATENT DOCUMENTS

| | | | | |
|---|---|---|---|---|
| 5,426,644 A * | 6/1995 | Fujimoto | ..................... | 370/535 |
| 6,559,892 B1 * | 5/2003 | Kikuchi | ..................... | 348/536 |
| 6,628,214 B1 * | 9/2003 | Kawase et al. | ............. | 341/100 |
| 6,917,762 B2 * | 7/2005 | Kim | ........................... | 398/158 |
| 2003/0208779 A1 * | 11/2003 | Green et al. | ................ | 725/143 |
| 2004/0181806 A1 * | 9/2004 | Sullivan | ..................... | 725/73 |
| 2004/0263941 A1 * | 12/2004 | Chen et al. | ................... | 359/245 |
| 2005/0034172 A1 | 2/2005 | Nohara et al. | | |

FOREIGN PATENT DOCUMENTS

| | | |
|---|---|---|
| JP | 2002-366340 | 12/2002 |
| JP | 2005-033451 | 2/2005 |

* cited by examiner (Continued)

Primary Examiner—Hanh Phan
(74) Attorney, Agent, or Firm—Harness, Dickey & Pierce, P.L.C.

(57) ABSTRACT

A multiplexer of a transmission section generates a clock signal by multiplying a reference clock signal of a digital image signal by a predetermined number 'K'. A parallel digital image signal is converted into a serial digital signal on the basis of the clock signal, and the serial digital signal is converted into an optical signal in an optical transmission section for transmitting. A demultiplexer extracts a reception clock signal from a serial digital reception signal which is converted into an electric signal in an optical reception section of a reception section, the serial digital reception signal is converted into a parallel signal and a signal corresponding to the parallel digital image signal on the basis of the reception clock signal, and a clock signal corresponding to the reference clock signal is recovered by multiplying the reception clock signal by '1/K'.

12 Claims, 27 Drawing Sheets

METHOD FOR TRANSMITTING DIGITAL IMAGE SIGNAL, DIGITAL IMAGE TRANSMITTING DEVICE, DIGITAL IMAGE SENDING DEVICE AND DIGITAL IMAGE RECEIVER

RELATED APPLICATIONS

This application claims priority to Japanese Patent Application Nos. 2003-289037 filed Aug. 7, 2003 and 2004-056186 filed Mar. 1, 2004 which are hereby expressly incorporated by reference herein in their entirety.

BACKGROUND

1. Technical Field

The present invention relates to a method for communicating (transmitting & receiving) digital image signal, a digital image communication (transmission & reception) device, a digital image transmitter and a digital image receiver enabling long distance communication.

2. Background Art

In the past, for example, as a method for sending a digital image signal to a display device such as an LCD monitor, a projector, etc. from a digital image reproducing device such as a computer, video image reproducing equipment, etc., metal wire transmission by coaxial cable was widely used.

As an interface for sending the digital image signal, the DVI (Digital Visual Interface) standard is used, and in the recent years, the HDMI (High Definition Multimedia Interface) standard, an extension based on the DVI standard including voice signal communication, is also proposed.

In these standards, a TMDS (Transition Minimized Differential Signaling) method is used for communication of image signal.

In these digital transmission standards, problems such as fluctuation or blurring of the picture, inaccuracy of color development, etc., which were conspicuous in prior analogue transmissions, are reduced.

However, digital transmission standards by metal wire transmission in high frequencies from several hundred MHz to several GHz have a problem in that image quality of the middle resolution class (XGA; 1024×768 pixel) can be communicated only up to around 10 m and image quality of the high resolution class (HDTV; 1920×1080 pixels) can be communicated only up to around 5 m.

Accordingly, for example, as shown in FIG. 25, for maintaining the image quality, a repeating driver 105, namely a repeater, comprising an amplifier, etc. is interposed between a transmission driver 102 for transmitting the digital image signal from digital image output equipment 101 such as a computer and a reception amplifier 104 for receiving the digital image signal transmitted from the transmission driver 102 and outputting the digital image signal to digital image input equipment 103 such as a display device connected with the transmission driver 102 and the reception amplifier 104.

In the DVI standard, DDC (Display Data Channel) CLOCK, DDC DATA, HPD (Hot Plug Detect) are respectively used as DDC signals for transmitting control information to the digital image output equipment 101 from the digital image input equipment 103. In FIG. 25, a transmission driver 111 transmits the DDC signals to the digital image output equipment 101 from the digital image input equipment 103; a reception amplifier 112 receives the DDC signals from the transmission driver 111; and a repeating driver 113 is interposed between the transmission driver 111 and the reception amplifier 112 and repeats the DDC signals.

The transmission driver 102 for transmitting digital image signal and the reception amplifier 112 for receiving the DDC signals constitute a transmission section 116, the repeating drivers 105 and 113 constitute a repeater 117, and the reception amplifier 104 and the transmission driver 111 constitute a reception section 118.

The digital image output equipment 101 and the transmission section 116, and the digital image input equipment 103 and the reception section 118 are respectively connected by DVI cables 120, and the transmission section 116 and the repeater 117, and the reception section 118 and the repeater 117 are respectively connected by coaxial cables 106 for every signal.

Furthermore, as shown in FIG. 26 or 27, a method for using fiber optic cables as transmission paths and an optical transmission device conforming to the specifications of the DVI standard and transmitting digital image signals is also proposed (for example, Japanese Unexamined Patent Application Publication No. 2002-366340).

In the optical transmission devices shown in FIGS. 26 and 27, image signals (R, G, B) and a reference clock signal (CLK) output from the digital image output equipment 101 are converted into optical signals for every signal at the transmission section 121 via a laser driver 122 and a laser diode 123, and the optical signals are transmitted for every signal by respectively corresponding fiber optic cables 124.

The respective optical signals received by a reception section 125 are respectively re-converted into electric signals by a photodiode (PD) 126 and a PD amplifier 127, and input into a terminal for DVI of the digital image input equipment 103.

The DDC signals are, in the case shown in FIG. 26, transmitted by metal wire such as coaxial cable. In the case shown in FIG. 27, the DDC signals are transmitted as optical signals (image signals) from the digital image input equipment 103 to the digital image output equipment 101 by a laser driver 127a, a diode 127b, a photodiode 122a and a PD amplifier 122b suitably prepared for communicating the DDC signals.

However, as shown in FIG. 25, in a communication device using a repeater, a power source is required respectively for the transmission section 116, the repeater 117 and the reception section 118, and a coaxial cable such as a BNC is required for each image signal of R, G, B, and CLK. Therefore, a complete system using this communication system is complex and costly due to the number of required components. Also, because of the number of components, the communication device is inconvenient to instal and use.

In such high frequency signal communication using metal wiring, EMI (electro-magnetic interference) would be a problem, and in long distance transmission, it would be possible that the problem becomes conspicuous.

Meanwhile, as shown in FIGS. 26 and 27, in an optical communication device transmitting the image signal by optical communication, a plurality of fiber optic cables or a cable formed by binding a plurality of fiber optic cables in one bundle is used. Such optical communication is costly and difficult to instal and use because a plurality of fiber optic cables/bundels is required.

Accordingly, in the present invention, such problems are considered and an object is to provide a digital image communication device, a digital image transmitter and a digital image receiver enabling long distance communication of a digital image signal at low cost and with high quality.

SUMMARY

In view of the above, a first technical means is provided in the form of a method for communicating a digital image signal including a parallel digital image signal and a reference clock signal, the digital image signal including at least corresponding image signals of RGB, wherein: a transmitter of the digital image signal generates a clock signal for carrying on the basis of the reference clock signal and converts the parallel digital image signal into an optical signal for transmitting after converting the parallel digital image signal into a serial digital image signal using the clock signal for carrying; a receiver of the digital image signal converts the received optical signal into a serial digital reception signal including electric signals; and a signal corresponding to the clock signal for carrying is extracted from the serial digital reception signal, the parallel digital image signal is recovered from the serial digital reception signal using the extracted clock extraction signal for carrying, and the reference clock signal is recovered from the clock extraction signal for carrying.

In the first technical means, the transmitter of the digital image signal generates the clock signal for carrying on the basis of the reference clock signal when transmitting the digital image signal including the parallel digital image signal (including the corresponding image signals of the RGB) and the reference clock signal, and the transmitter converts the serial digital image signal into an optical signal for transmitting after converting the parallel digital image signal into the serial digital image signal using the clock signal for carrying.

Meanwhile, the receiver of the digital image signal converts the received optical signal into the serial digital reception signal and extracts a signal corresponding to the clock signal for carrying from the serial digital reception signal. The parallel digital image signal is recovered from the serial digital reception signal using the extracted clock extraction signal for carrying, and the reference clock signal is recovered from the clock extraction signal for carrying.

The digital image signal transmitted between the transmitter and the receiver of the digital image signal is an optical signal converted into the serial digital image signal, that is, the digital image signal can be transmitted by a single optical transmission cable. Thereby, by optical communication, the digital image signal can be transmitted for a long distance with high quality but without increased costs.

Second technical means is a method for communicating a digital image signal wherein a receiver of the digital image signal converts a receiver control signal including a control signal of at least one system of the receiver into a second optical signal for transmitting after converting the receiver control signal into a receiver control serial signal using the clock extraction signal for carrying; a transmitter of the digital image signal converts the received second optical signal into the receiver control serial reception signal including electric signals; and the receiver control signal is recovered from the receiver control reception signal using the clock signal for carrying.

In the second technical means, the receiver of the digital image signal converts the receiver control signal including the control signal of at least one system of the receiver into the second optical signal for transmitting after converting the receiver control signal into the receiver control serial signal using the clock extraction signal for carrying.

Meanwhile, the transmitter of the digital image signal converts the received second optical signal into the receiver control serial reception signal including electric signals; and the receiver control signal is recovered from the receiver control reception signal using the clock signal for carrying.

The receiver control signal transmitted between the transmission side and the receiving side of the digital image signal is an optical signal converted into the receiver control serial signal, that is, the receiver control signal can be transmitted by a single optical transmission cable. This means that the digital image signal and the receiver control signal can be transmitted by a set of two optical transmission cables which are widely used in general optical transmission devices. Thereby, by optical communication, the digital image signal can be transmitted for a long distance with high quality and long distance transmission of the receiver control signal can be realized without increased costs.

Third technical means is a digital image communication device comprising: a digital image transmitter transmitting a digital image signal including a parallel digital image signal and a reference clock signal, the parallel digital image signal including at least corresponding image signals of RGB; and a digital image receiver receiving the digital image signal from the digital image transmitter; wherein the digital image transmitter comprises clock generating means for generating a clock signal for carrying on the basis of the reference clock signal, parallel/serial conversion means for converting the parallel digital image signal into a serial digital image signal using the clock signal for carrying generated by the clock generating means, and optical signal transmitting means for converting the serial digital image signal converted by the parallel/serial conversion means into an optical signal and transmitting the optical signal via a cable for optical transmission; and wherein the digital image receiver comprises optical signal receiving means for receiving the optical signal transmitted by the optical signal transmitting means via the cable for optical transmission and converting the optical signal into a serial digital reception signal including electric signals, clock signal extracting means for extracting the clock signal for carrying from the serial digital reception signal converted by the optical signal receiving means, serial parallel converting means for recovering the parallel digital image signal from the serial digital reception signal using the clock extraction signal for carrying extracted by the clock signal extracting means, and reference clock recovering means for recovering the reference clock signal from the clock extraction signal for carrying.

In the third technical means, the digital image communication device converts the parallel digital image signal into the serial digital image signal by parallel/serial conversion means using the clock signal for carrying generated by the clock generation means on the basis of the reference clock signal when transmitting the digital image signal including the parallel digital image signal (including at least the corresponding image signals of RGB) and the reference clock signal, converts the serial digital image signal into the optical signal by the optical signal transmitting means, and transmits the serial digital image signal via the optical transmission cable.

In the digital image receiver, the optical signal received via the optical transmission cable is converted into an electric signal by the optical signal receiving means as the serial digital reception signal, a signal corresponding to the clock signal for carrying is extracted from the serial digital reception signal by the clock signal extraction means, the parallel digital image signal is recovered from the serial digital reception signal using the extracted clock extraction signal for carrying by the serial/parallel conversion means, and the reference clock signal is recovered from the clock extraction signal for carrying by reference clock recovery means.

The digital image signal transmitted from the digital image transmitting device to the digital image receiver is an optical signal converted into the serial digital image signal, that is, the digital image signal can be transmitted by a single optical transmission cable. Thereby, by optical communication, the digital image signal can be transmitted for a long distance with high quality without increased costs.

Fourth technical means is a digital image communication device; wherein the digital image transmitter comprises encoding means for eliminating a code bias of data to be sent to the digital image receiver, and the digital image receiver comprises decoding means capable of decoding the signal encoded by the encoding means into an original signal.

In the fourth technical means, the digital image transmitter comprises encoding means for eliminating a code bias of data to be sent to the digital image receiver. The digital image receiver comprises decoding means for decoding the signal encoded by the encoding means into the original signal.

When the clock signal for carrying is extracted by comparing a timing of a code change of the input serial digital reception signal and the same code succeeds in the serial digital reception signals, extraction accuracy of the clock signal is lowered since the change of comparison of timing of the code change decreases.

However, since data is transmitted after encoding so as to eliminate a code bias of the transmitted data and the received data is decoded by the decoding means in the digital image reception device, a lowering of extraction accuracy of the clock signal due to the code bias can be prevented.

Fifth technical means is a digital image communication device wherein: the digital image transmitter comprises error code addition means for adding a code for error detection to data to be sent to the digital image receiver, and the digital image receiver comprises error detecting means for error detection on the basis of the code for error detection.

In the fifth technical means, the digital image transmitter comprises error code addition means for adding the code for error detection to the data to be transmitted to the digital image reception device, adds the error code and transmits the data. Accordingly, since the digital image reception device can detect error on the basis of the code for error detection in the error detecting means, for example, when the error code is not included in the transmission standard, a transmission error can be properly detected.

Sixth technical means is a digital image communication device wherein: the digital image receiver comprises control signal conversion means for converting a receiver control signal of the digital image receiver into a receiver control serial signal using the clock signal for carrying extracted by the clock extraction means, and optical signal transmitting means for converting the receiver control serial signal converted by the control signal conversion means into an optical signal and transmitting the optical signal via a cable for optical transmission; and wherein the digital image transmitter comprises optical signal receiving means for receiving the optical signal transmitted by the optical signal transmitting means via the cable for optical transmission and converting the optical signal into a receiver serial control reception signal including electric signals, and control signal recovering means for recovering the receiver control signal from the receiver control serial signal reception signal using the clock signal for carrying generated by the clock generating means.

In the sixth technical means, the digital image receiver converts the receiver control signal into the receiver serial control signal using the clock signal for carrying extracted by the clock extraction means.

The digital image transmitter converts the optical signal received via the transmission cable into an electric signal by optical signal receiving means, uses the electric signal as the receiver control serial reception signal, and recovers the receiver control signal from the receiver control serial reception signal using the clock signal for carrying by the control signal recovery means.

The receiver control signal sent to the digital image transmitter is an optical signal converted into the receiver control serial signal, that is, the receiver control signal can be transmitted by a single optical transmission cable. Thereby, in addition to the effect of the third technical means, the receiver control signal can also be transmitted for a long distance by the optical signal.

Seventh technical means is a digital image communication device; wherein in the digital image transmitter, the optical signal transmitting means and the optical signal receiving means join optical signal paths by a half mirror, in the digital image receiver, the optical signal receiving means and the optical signal transmitting means join optical signal paths by a half mirror; and the optical signals can be communicated (transmitted/received) by a single path of an optical transmission cable.

In the seventh technical means, in the digital image communication device, the optical signal transmitting means and the optical signal receiving means join optical signal paths by a half mirror, and in the digital image receiver, the optical signal receiving means and the optical signal transmitting means join optical signal paths by a half mirror.

Since the respective optical paths of the digital image transmitter and the digital image receiver are identical, the two optical signals can be communicated by a single optical transmission cable. Accordingly, the digital image and the receiver control signal can be transmitted for a long distance with high quality by a single optical transmission cable without increased costs.

Eighth technical means is a digital image communication device; wherein the optical signals have different wavelengths from each other.

In the eighth technical means, the two joined optical signals have different wavelengths from each other. There would be a problem in that the transmission error rate is high due to interference when the two optical signals have the same wavelengths.

However, since the two optical signals have different wavelengths from each other, lower interference results and the transmission error rate is not high.

Ninth technical means is a digital image communication device wherein the optical signals are transmitted by time-division wherein one of the signals is in a transmission or reception state and the other signal is in a dormant state, and these states are periodically alternated.

In the ninth technical means, only one of the two signals is in a transmission state or a reception state at a time. The other is in a dormate state. The states are alternated among the signals periodically. Since the two optical signals are not in a transmission or reception state at the same time, an interference effect is prevented and the transmission error rate is not high.

Tenth technical means is a digital image communication device wherein the digital image signal includes voice data.

In the tenth technical means, voice data in addition to the digital image signal can be transmitted for a long distance with high quality and at low cost.

Eleventh technical means is a digital image communication device wherein the digital image signal complies with the DVI (Digital Visual Interface) standard.

In the eleventh technical means, a digital image signal complying with the DVI standard can be transmitted for a long distance with high quality and at low cost.

Twelfth technical means is a digital image communication device wherein the digital image signal complies with the HDMI (High Definition Multimedia Interface) standard.

In the twelfth technical means, a digital image signal complying with the HMDI standard can be transmitted for a long distance with high quality and at low cost.

In the thirteenth technical means, a digital image transmitter is provided, the digital image transmitter transmits a digital image signal and a reference clock signal, the digital image signal includes a parallel digital image signal which includes at least corresponding image signals of RGB, the transmitter comprises: clock generating means for generating a clock signal for carrying on the basis of the reference clock signal, parallel/serial conversion means for converting the parallel digital image signal into a serial digital image signal using the clock signal for carrying generated by the clock generating means, and optical signal transmitting means converting the serial digital image signal converted by the parallel/serial conversion means into an optical signal for sending.

In the thirteenth technical means, the digital image transmission device converts the parallel digital image signal into the serial digital image signal by parallel/serial conversion means using the clock signal for carrying generated by the clock generation means on the basis of the reference clock signal when transmitting the digital image signal including the parallel digital image signal (including at least the corresponding image signals of RGB) and the reference clock signal, and converts the serial digital image signal into the optical signal by the optical signal transmitting means for transmitting.

Since the digital image signal is converted into the serial digital image signal, only a single cable for transmitting the optical signal is needed. Thereby, by optical communication, the digital image signal can be transmitted for a long distance with high quality and only a single cable for sending the optical signal is needed without increased costs.

Fourteenth technical means is a digital image receiver receiving a digital image signal including a parallel digital image signal and a reference clock signal, the parallel digital image signal including at least corresponding image signals of RGB, the receiver receiving the parallel digital image signal as an optical signal comprising a serial digital image signal of which the parallel digital image signal is converted into a serial signal using the clock signal for carrying generated on the basis of the reference clock signal; wherein the digital image receiver comprises optical signal receiving means for receiving the optical signal and converting the optical signal into a serial digital reception signal comprising electric signals, clock signal extracting means for extracting the clock signal for carrying from the serial digital reception signal converted by the optical signal receiving means, serial/parallel converting means for recovering the parallel digital image signal from the serial digital reception signal using the clock extraction signal for carrying extracted by the clock signal extracting means, and reference clock recovering means for recovering the reference clock signal from the clock extraction signal for carrying.

In the fourteenth technical means, the optical signal receiving means receives the digital image signal including the parallel digital image signal (including at least corresponding image signals of RGB) and the reference clock signal as an optical signal comprising the serial digital image signal of which the parallel digital image signal is converted into the serial signal using the clock signal for carrying generated on the basis of the reference clock signal and converts the optical signal into the serial digital reception signal comprising an electric signal. From the serial digital reception signal, the clock signal for carrying is extracted by the clock signal extraction means and the parallel digital image signal is recovered from the serial digital reception signal using the extracted clock extraction signal for carrying by the serial parallel conversion means. The reference clock signal is recovered from the clock reference signal for carrying by the reference clock recovery means.

Since the digital image signal is converted into the serial digital image signal, only a single cable for receiving the optical signal is needed. Thereby, by optical communication, the digital image signal can be transmitted for a long distance with high quality and only a single cable for receiving the optical signal is needed without increased costs.

DETAILED DESCRIPTION

Embodiments of the present invention are described below. First, a first embodiment is described.

Figure 1:
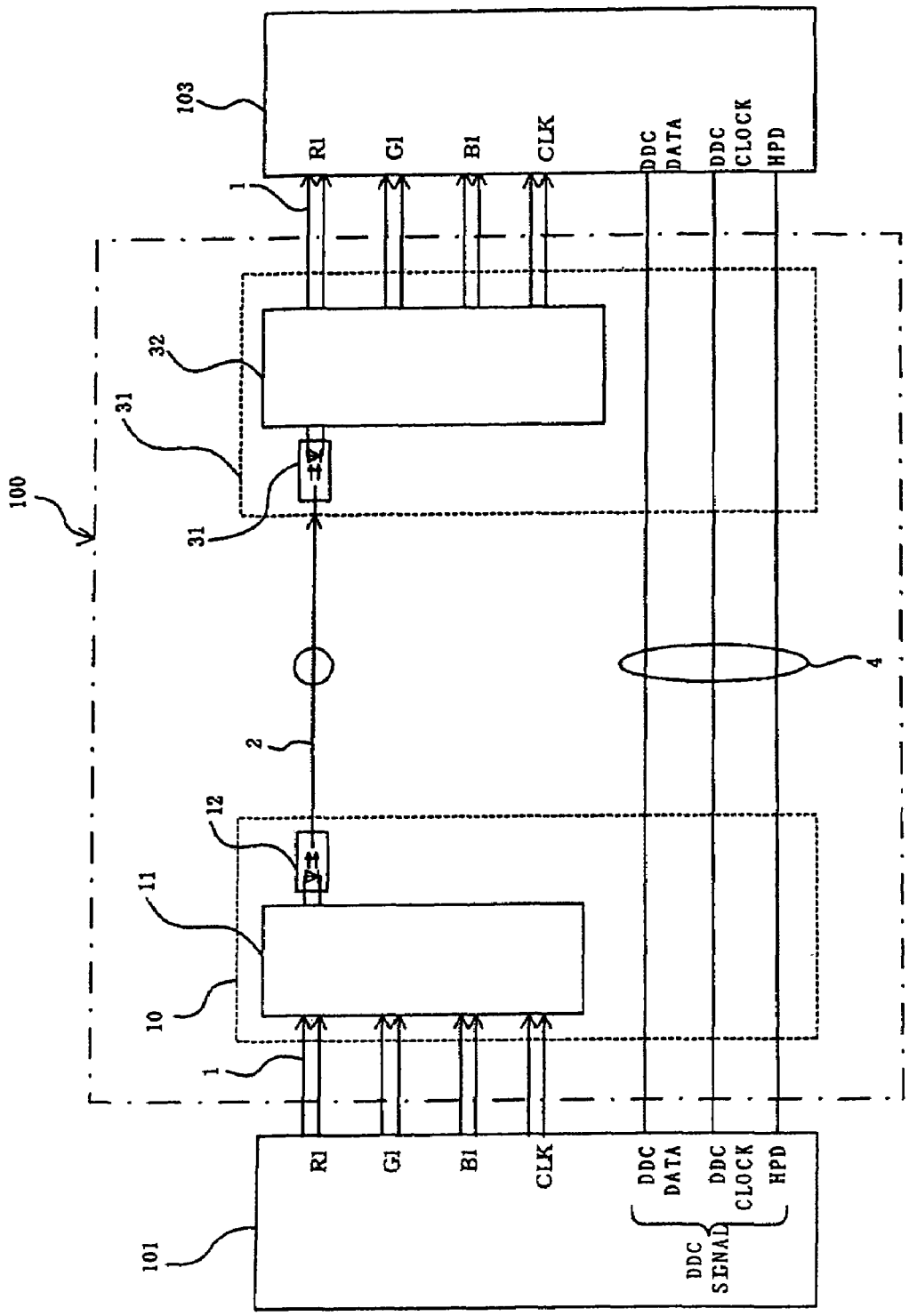
FIG. 1 shows an outline block diagram illustrating an example of a digital image communication device according to the present invention.

FIG. 1 shows an outline block diagram illustrating an example of a digital image communication device according to the present invention.

As shown in FIG. 1, the digital image communication device 100 includes a transmission section 10 arranged in the vicinity of digital image output equipment 101 outputting a digital image signal, a reception section 30 arranged in the vicinity of a digital image input equipment 103 receiving the digital image signal of such as a display device, and a fiber optic cable 2 connecting the transmission section 10 and the reception section 30.

The digital image output equipment 101 and the digital image input equipment 103 have TMDS1 link type DVI standard interfaces as their respective interfaces. The digital image output equipment 101 and the transmission section 10, and the digital image input equipment 103 and the reception section 30 are respectively connected by DVI cables 1 complying with the DVI standard interface. The transmission section 10 and the reception section 30 are connected by the fiber optic cable 2, and data communication between the digital image output equipment 101 and the digital image input equipment 103 is performed by optical communication via the transmission section 10 and the reception section 30.

A line indicated by the reference numeral 2 in FIG. 1 is the fiber optic cable.

In the DVI standard, the TMDS type is adopted as the digital communication type. In the TMDS type, a digital RGB image signal includes four channels in a set of red R1, green G1 and blue B1 and a reference clock signal CLK, and a vertical synchronizing signal, a horizontal synchronizing signal and a control signal are mixed in other channels of the channel for the reference clock signal, and a so called TMDS1 link is used. In the TMDS type, a differential signal is used.

The digital image output equipment 101 and the transmission section 10, the transmission section 10 and the reception section 30, and the digital image input equipment 103 and the reception section 30 are respectively connected by metal wiring 4 such as coaxial cables for communicating DDC signals such as control information from the digital image input equipment 103 to the digital image output equipment 101 and DDC (Display Data Channel) CLOCK, DDC DATA, and HPD (Hot Plug Detect) signals are transmitted as receiver control signals via the corresponding metal wiring 4.

The transmission section 10 comprises a multiplexer 11 receiving three image signals of R, G and B and a reference clock signal CLK as parallel signals, converting these signals into serial signals and outputting them as serial digital image signals, and an optical transmission section 12, comprising a laser diode and a laser driver for driving the laser diode, converts the serial digital image signal from the multiplexer 11 into an optical signal 1 and transmits the optical signal via the fiber optic cable 2.

Figure 2:
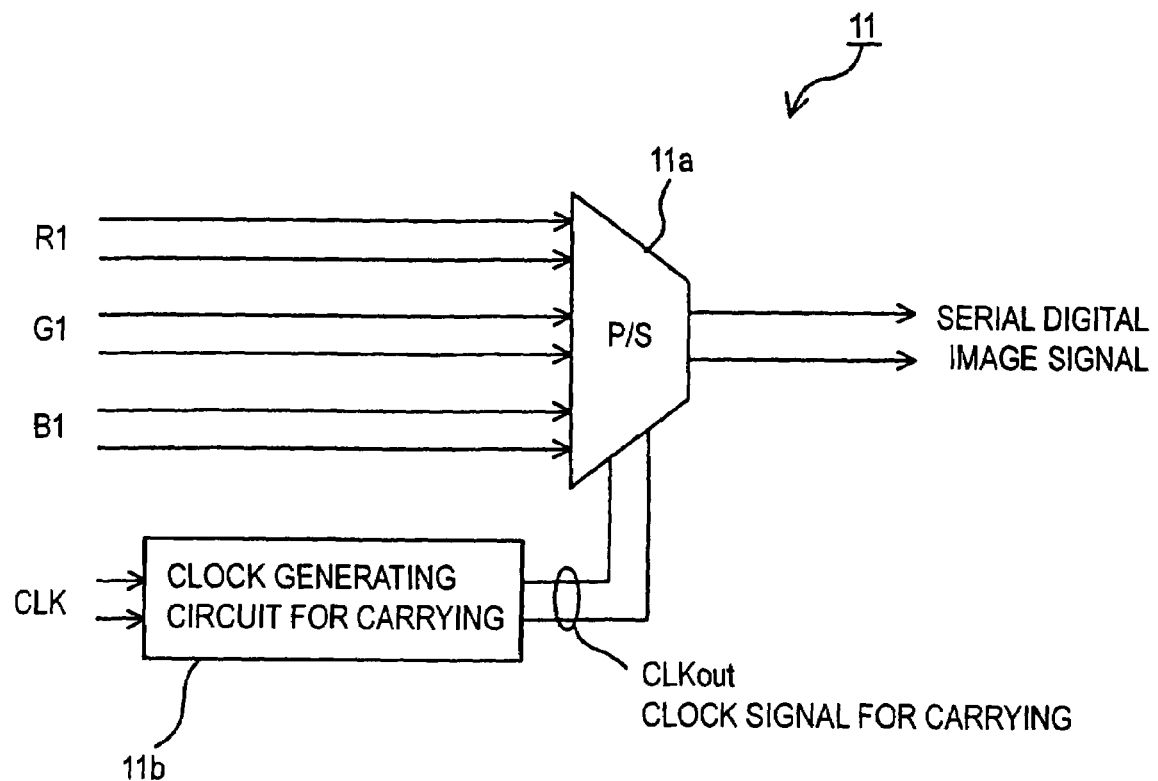
FIG. 2 shows a block diagram illustrating one example of a multiplexer in the first embodiment.

The multiplexer 11 includes, for example as shown in FIG. 2, a parallel/serial conversion circuit (P/S) 11a converting a parallel signal into a serial signal, and a "clock generating circuit 11b for carrying" generating a clock signal CLKout for carrying having higher frequency than the reference clock signal CLK on the basis of the reference clock signal CLK, and the clock generating circuit 11b for carrying includes, for example, a clock multiplier or a frequency multiplication circuit.

The parallel/serial conversion circuit 11a receives the corresponding image signals of R, G and B from the digital image output equipment 101 and converts the RGB image signals input in parallel on the basis of the clock signal CLKout for carrying generated by the clock generating circuit 11b for carrying into the serial digital image signals.

Figure 3:
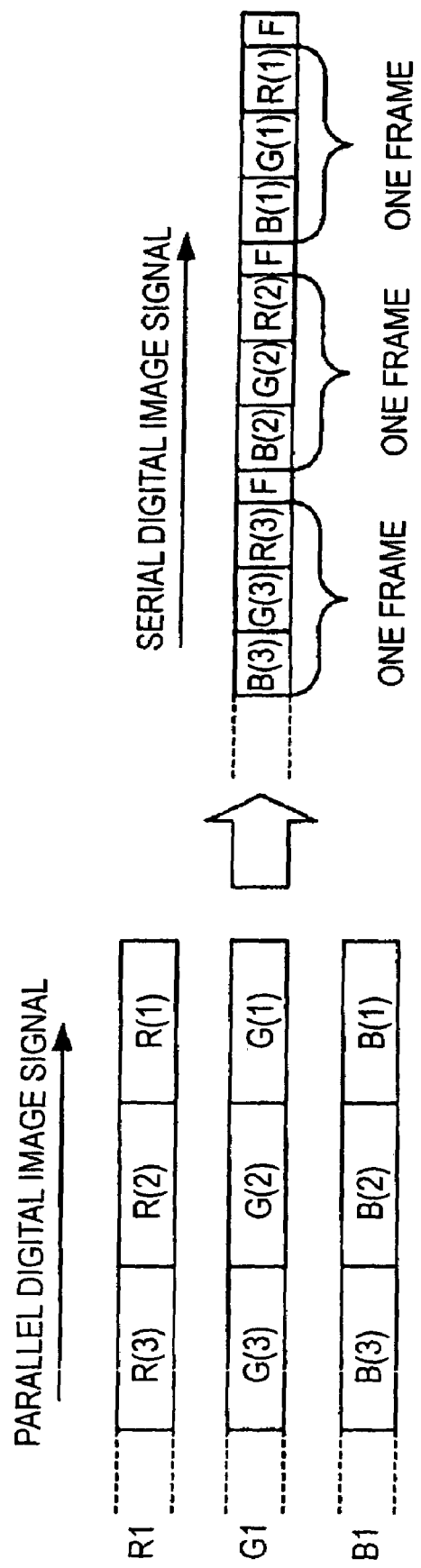
FIG. 3 shows an explanatory drawing for describing operation of a parallel/serial conversion circuit in FIG. 2.

The R, G and B image signals are, for example, in the TMDS type, as shown in FIG. 3, divided for every 10 bits of data. The parallel/serial conversion circuit 11a serially converts one division of the data of the corresponding image signals as a data unit in the order of R, G and B. The image signals of R, G and B serially arranged for every one data unit make one frame, and a frame detection code F for identifying the frame is added in front of the image signal R for a predetermined number of frames (in FIG. 3, for every one frame). This is output as a serial digital image signal.

In the clock generating circuit 11b for carrying, the frequency of the reference clock signal CLK is multiplied by a preset number 'K' and the clock signal CLKout for carrying is generated. The multiplier 'K' of the reference clock signal CLK is not limited to an integer but is set to be a value determined by the length of serial signal to be transmitted to the reception section 30, namely the length of the RGB image signal and control information F and possibly a predetermined frequency of the recovered parallel digital image signal when the RGB image signal converted into the serial signal and the control information F are recovered into the parallel digital image signal at the reception section 30.

Meanwhile, the reception section 30 includes, as shown in FIG. 1, an optical reception section 31 comprising a photodiode and a PD amplifier for receiving the optical signal from the fiber optic cable 2, and a demultiplexer 32 recovering the RGB image signal and the reference clock signal CLK from the serial digital reception signal converted into an electric signal in the optical reception section 31.

Figure 4:
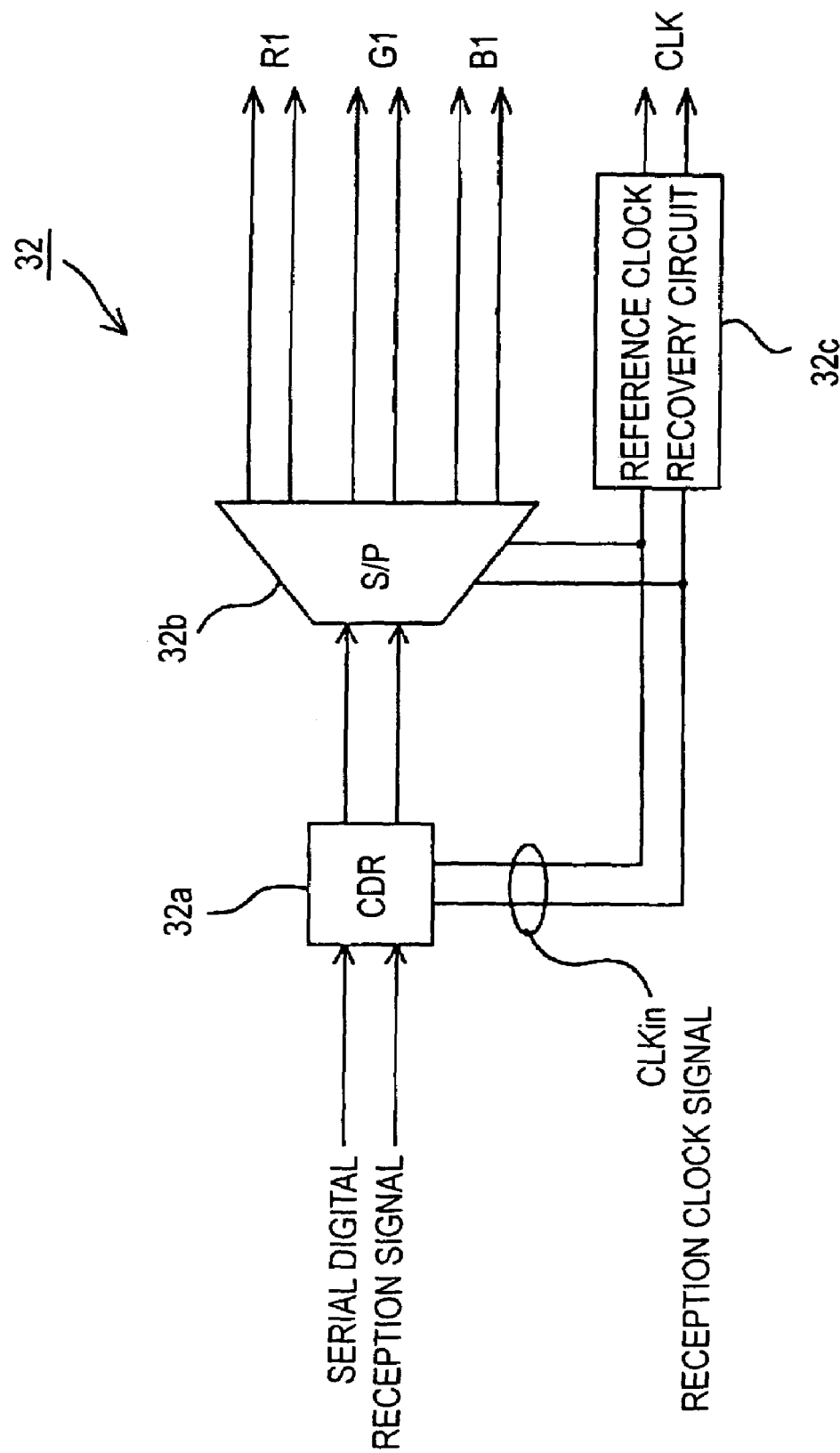
FIG. 4 shows a block diagram illustrating one example of a demultiplexer in the first embodiment.

The demultiplexer 32 includes, as shown in FIG. 4, a clock data recovery circuit (CDR) 32a extracting a reception clock signal CLKin corresponding to the clock signal "CLKout for carrying" from the serial digital reception signal converted into the electric signal, a serial/parallel conversion circuit (S/P) 32b converting the serial digital reception signal into a parallel digital reception signal using the reception clock signal CLKin, and a reference clock recovery circuit 32c recovering the reference clock signal CLK from the reception clock signal CLKin on the basis of the reception clock signal CLKin.

The clock data recovery circuit 32a includes a clock data recovery circuit, corrects the timing of the serial digital reception signal on the basis of the reception clock signal CLKin extracted from the serial digital reception signal and outputs a re-timed serial digital reception signal.

The serial/parallel conversion circuit 32b converts the re-timed serial digital reception signal into a parallel signal on the basis of the reception clock signal CLKin extracted in the clock data recovery circuit 32a. The converted parallel digital reception signal is output as the RGB image signal and the clock signal recovered in the reference clock recovery circuit 32c as a reference clock signal CLK is output to the digital image input equipment 103.

The reference clock recovery circuit 32c multiplies the reception clock signal CLKin extracted by the clock data recovery circuit 32a by the number '1/K' on the basis of a predetermined multiplier 'K' in the clock generating circuit 11b for carrying of the transmission section 10 and converts it into a clock signal with a frequency corresponding to the reference clock signal CLK.

Next, operations of the first embodiment are described.

The parallel digital image signal comprising a set of red R1, green G1 and blue B1 output from a DVI output terminal of the digital image output equipment 101 is input into a parallel/serial conversion circuit 11a in the multiplexer 11. The frequency of the reference clock signal CLK is multiplied by a predetermined number 'K' by the clock generating circuit 11b for carrying and supplied to the parallel/serial conversion circuit 11a as the clock signal CLKout for carrying required for operation of the parallel/serial conversion circuit 11a.

The parallel/serial conversion circuit 11a converts a parallel signal comprising the RGB image signals into a serial signal on the basis of the supplied clock signal CLKout for carrying. Accordingly, the obtained serial digital image signal as shown in FIG. 3 is converted into an optical signal by an optical transmission section 12 and transmitted via the fiber optic cable 2.

When receiving the optical signal via the fiber optic cable 2, the reception section 30 converts the optical signal into an electric signal in an optical reception section 31. The serial digital reception signal converted into the electric signal is input into the clock data recovery circuit 32a of the demultiplexer 32, the reception clock signal CLKin is extracted, and the timing is corrected for the serial digital reception signal on the basis of the reception clock signal CLKin.

On the basis of the reception clock signal CLKin, the serial/parallel conversion circuit 32b converts the serial digital reception signal into a parallel digital reception signal. The parallel digital reception signal is a signal corresponding to the RGB image signals, that is, the parallel digital image signal transmitted from the digital image output equipment 101 is recovered.

The reception clock signal CLKin is multiplied by '1/K' in the reference clock recovery circuit 32c and converted into a clock signal with a frequency corresponding to the reference clock signal CLK.

The clock signal is a signal corresponding to the reference clock signal CLK, that is, the reference clock signal is recovered.

Though the data transmitted via the fiber optic cable 2 is converted into a serial signal, the digital image signal at the input equipment 103 side is not affected at all, and it is in an equivalent state as if directly receiving the digital image signal from the digital image output equipment 101.

As shown in FIG. 1, the transmission section 10 converts the RGB parallel digital image signals into a serial signal for transmitting. That is, one fiber optic cable 2 can transmit the RGB image signals and the reference clock signal CLK. As such, fiber optic cables prepared respectively for the RGB image signals and the reference clock signal CLK are not required as in the past.

Accordingly, compared to past cases, the required number of fiber optic cables/bundles can be reduced. Thus, because of the reduction in the number of fiber optic cables/bundles, the number of components of the entire digital image signal communication device can be reduced and the trouble associated with the installation of fiber optic cables can be also reduced. Also, in general, optical transmitting/receiving section parts are expensive because an optical axis adjustment process is required in the manufacturing process. However, in comparison to four or more sets of optical transmitting/receiving sections in the past cases, the present embodiment can be realized with only one set of optical transmitting/receiving section parts and thereby costs can be sharply reduced.

Since the digital image output equipment 101 and the digital image input equipment 103 are connected by the fiber optic cable 2, installation of a repeater is not required as in a case with metal wiring connections, etc. and long distance communication can be performed while maintaining high quality. Since installation of a repeater is not required, an increase in the number of system components can be restrained and the associated cost increase can also be restrained.

When the digital image output equipment 101 is connected by a DVI interface, DDC signals such as DDC CLOCK, DDC DATA, and HPD, etc. are required for transmission to the digital image output equipment 101 from the digital image input equipment 103 for transmitting control information, etc. The DDC CLOCK and the DDC DATA have the maximum frequency of 100 kHz when driving the digital image input equipment 103 in the standard mode, and since the HPC signal is a DC level signal, it does not have any problems even if the line is connected by a general low-cost lead wire.

Figure 5:
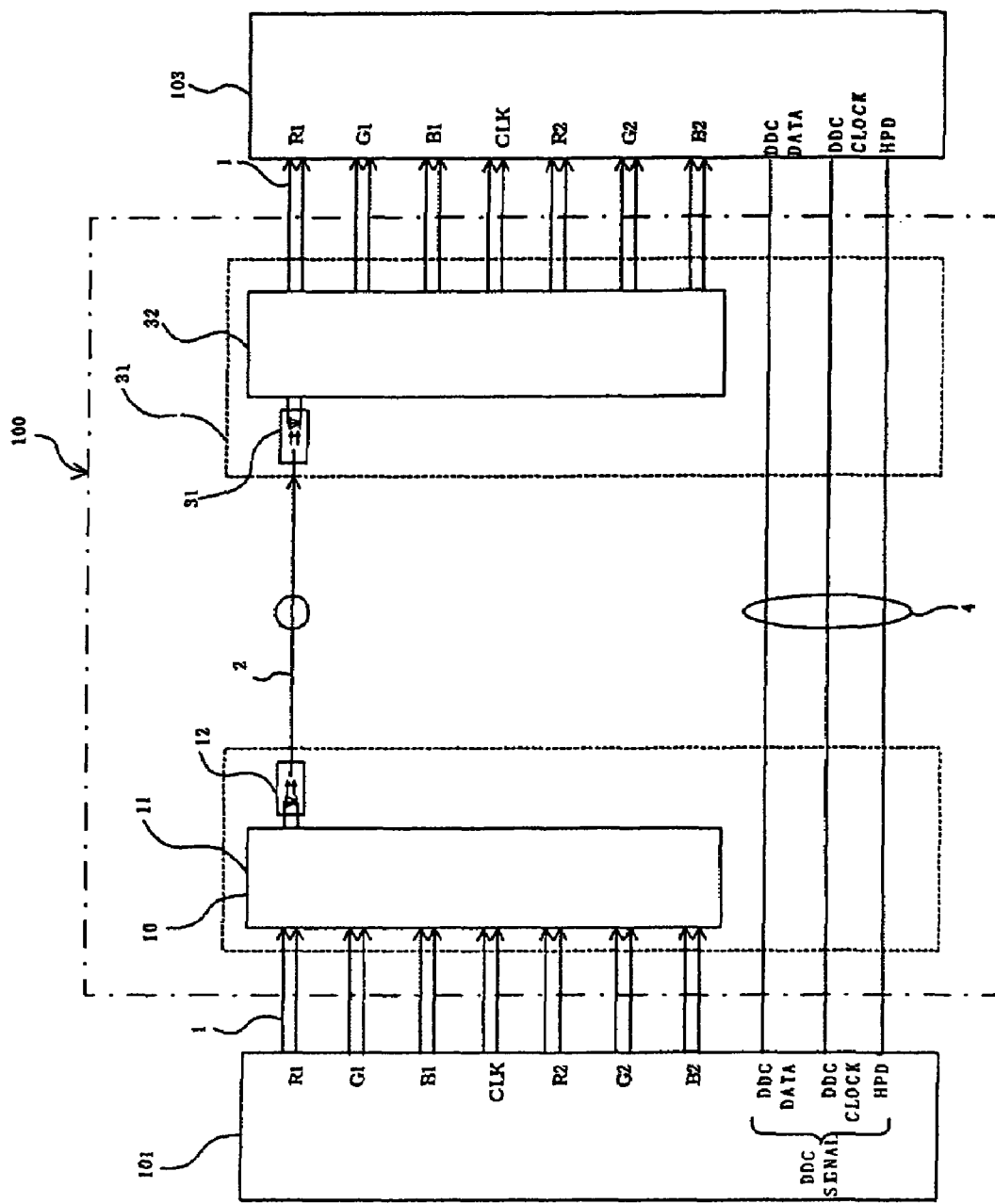
FIG. 5 shows an outline block diagram illustrating another example of a digital image communication device.

Though in the first embodiment as described above, a case of adapting a TMDS1 link type digital image communication system is described, the embodiment can also be adapted to a TMDS 2 link type digital image communication system using seven channels by adding red R2, green G2 and blue B2 as shown in FIG. 5.

Figure 6:
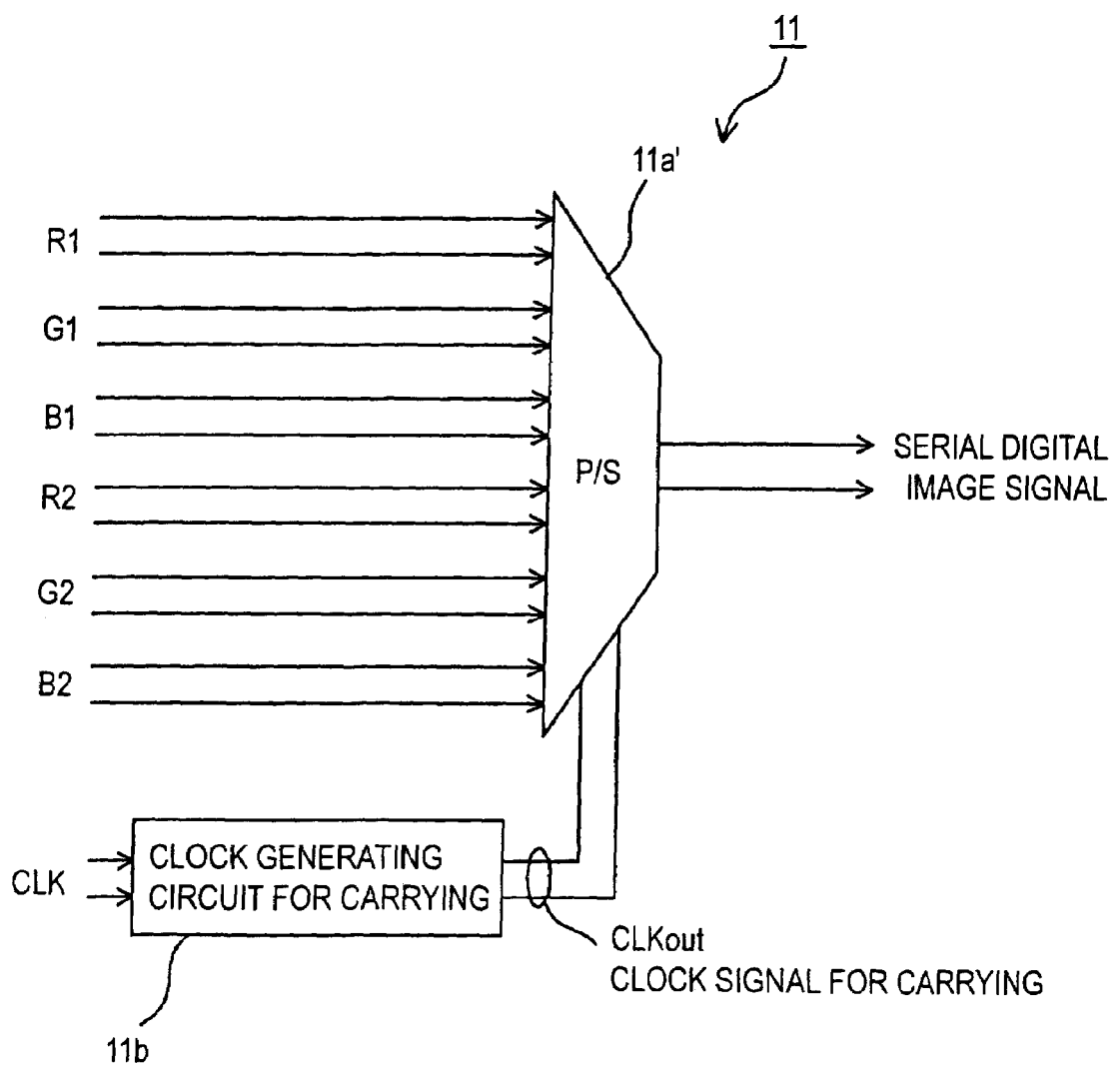
FIG. 6 shows a block diagram illustrating an example of a multiplexer in FIG. 5.
Figure 7:
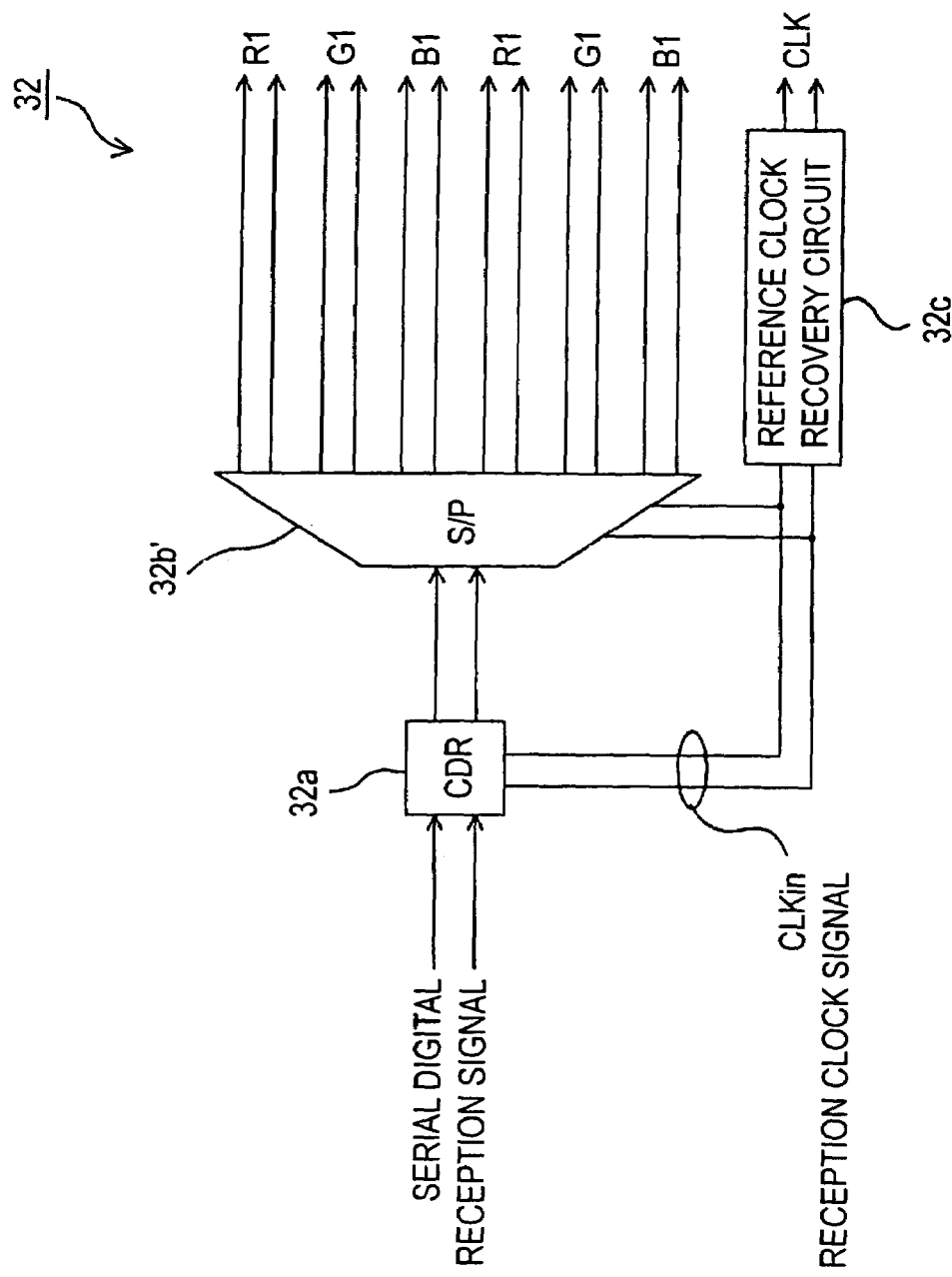
FIG. 7 shows a block diagram illustrating an example of a demultiplexer in FIG. 5.

In this case, a parallel/serial conversion circuit 11a' for serial conversion of two sets of RGB image signals is prepared in the transmission section 10 as shown in FIG. 6, and the parallel digital image signal is converted into a serial digital image signal for respective data division in the order of R1, G1, B1, R2, G2 and B2. As shown in FIG. 7, it is preferable that a serial/parallel conversion circuit 32b' for parallel conversion of the serial digital reception signal into two sets of RGB image signals is prepared in the reception section 30, and that the clock data recovery circuit 32a converts the re-timed serial digital reception signal corrected in its timing, etc. into six parallel signals of R1, G1, B1, R2, G2 and B2 and recovers two sets of RGB parallel signals.

Thereby, an equivalent effect to the first embodiment can be obtained, and since two TMDS links are used, higher speed transmission and/or larger data width (high resolution, high refresh rate, color depth of eight bits or more) can be realized, and highly fine digital image signals can be communicated.

Next, a second embodiment according to the present invention is described.

Since the second embodiment is similar to the first embodiment except for the structures of the transmission section 10 and the reception section 30, identical reference numerals are given to identical parts, and a detailed description is omitted.

Figure 8:
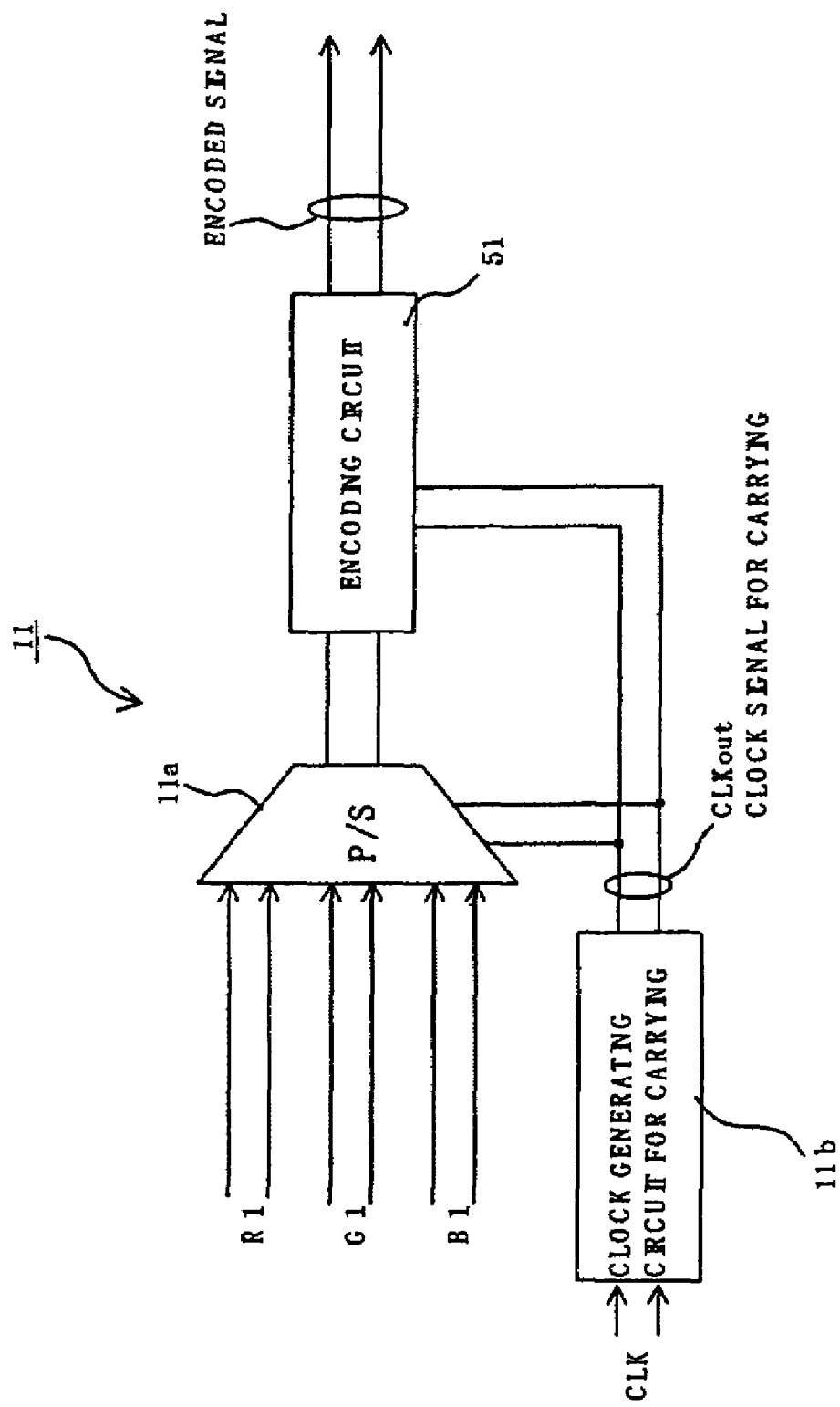
FIG. 8 shows a block diagram illustrating one example of a multiplexer in the second embodiment.

In the second embodiment, a multiplexer 11 of a transmission section 10 comprises, as shown in FIG. 8 and similar to the first embodiment, a parallel/serial conversion circuit 11a receiving RGB image signals in parallel and converting the RGB image signals into a serial signal on the basis of a clock signal "CLKout for carrying", a "clock generating circuit 11b for carrying" generating the clock signal CLKout for carrying by multiplying a reference clock signal CLK by a predetermined number, and an encoding circuit 51 encoding a serial digital image signal output from the parallel/serial conversion circuit 11a.

Figure 9:
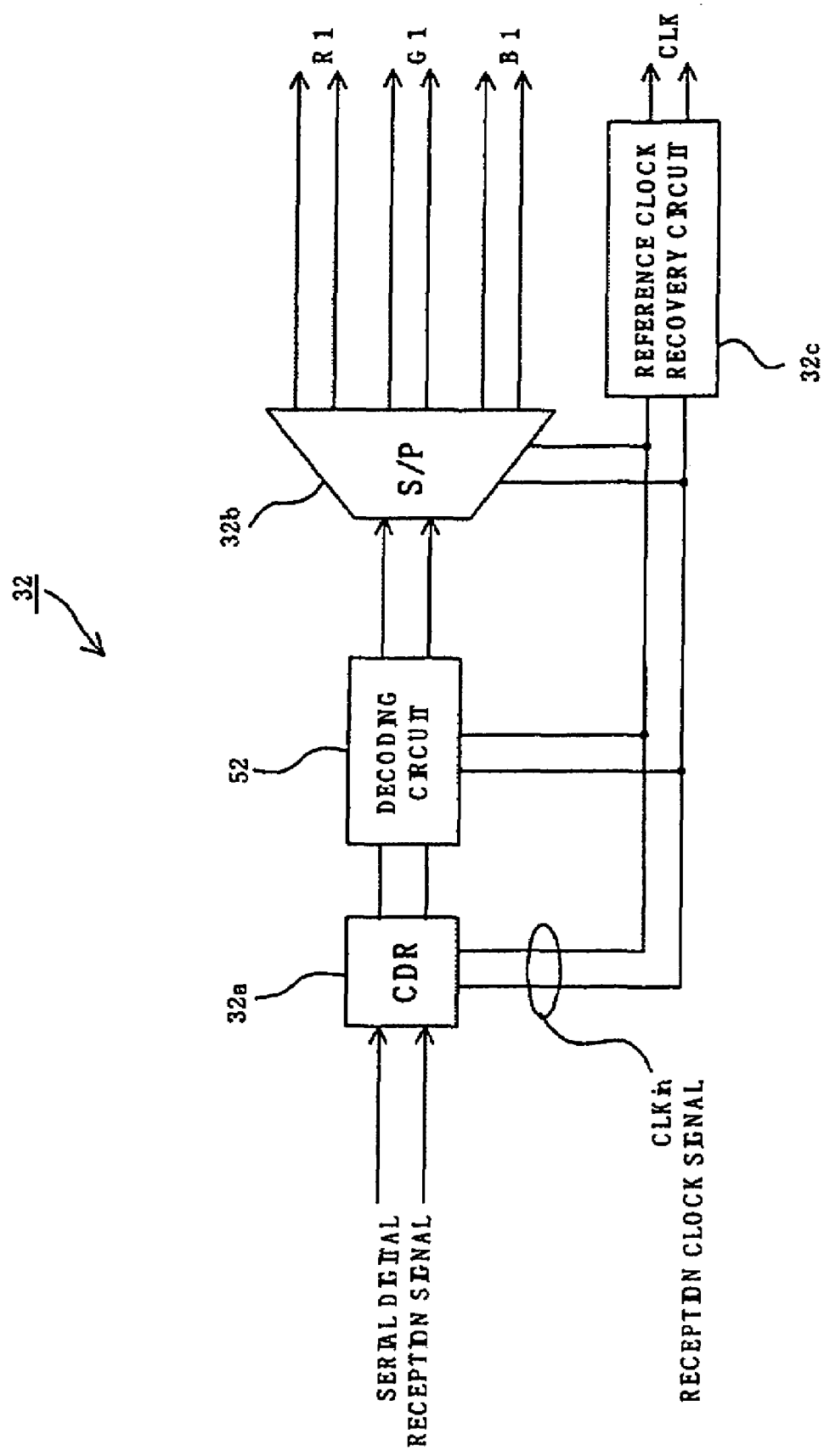
FIG. 9 shows a block diagram illustrating one example of a demultiplexer in the second embodiment.

A demultiplexer 32 of a reception section 30 comprises, as shown in FIG. 9 and similar to the first embodiment, a clock data recovery circuit (CDR) 32*a* extracting a reception clock signal CLKin from a serial digital reception signal converted into an electric signal, a serial/parallel conversion circuit (S/P) 32*b* converting the serial digital reception signal into a parallel digital reception signal using the reception clock signal CLKin, and a reference clock recovery circuit 32*c* recovering the reference clock signal CLK from the reception clock signal CLKin and further comprises a decoding circuit 52 between the data recovery circuit (CDR) 32*a* and the serial/parallel conversion circuit 32*b*.

The encoding circuit 51 comprising, for example, a data scrambler or an encoder, etc. inputs the clock signal CLKout for carrying as a signal required for circuit operation and encodes the serial digital image signal converted by the parallel/serial conversion circuit 11*a* such that in the serial digital image signal, the same code, or '0' or '1' does not extremely succeed and the numerical balance between different codes, or a mark ratio, is nearly 50%.

To be more particular, an optional bit is added and the code is converted by an optional algorithm or a table. In such an encoding system, for example, a scramble system of an HDTV signal which is described in the standard specification BTA-S004A of the Association of Radio Industries and Businesses can be used. In the standard specification BTA-S004A, the generating function G(x) of a scrambler is G(x)=$(x^9+x^4+1)(x+1)$. Where, $(x^9+x^4+1)$ is a term for the scramble and (X+1) is a term for nonpolarization.

The encoding system is not limited to the above and a conversion system can be adapted such that the same code does not extremely succeed and the numerical balance between different codes is nearly 50%.

Meanwhile, the decoding circuit 52 inputs the reception clock signal CLKin as a signal required for circuit operation, performs reverse conversion to the encoding of the encoding circuit 51, or conversion permitting recovering the encoded signal into an original signal, performs decoding on the serial digital reception signal corrected in timing by the clock data recovery circuit 32*a*, and recovers a signal corresponding to the serial digital image signal before encoding by the encoding circuit 51.

Accordingly, in the second embodiment, in the parallel/serial conversion circuit 11*a* of the multiplexer 11 of the transmission section 10, the converted serial digital image signal is converted into an optical signal for transmitting in an optical transmission section 12 after being encoded in the encoding circuit 51. In the reception section 30, the optical reception section 31 converts the optical signal into an electric signal and the clock data recovery circuit 32*a* of the demultiplexer 32 corrects the timing, and then the decoding circuit 52 performs decoding on the electric signal and the serial/parallel conversion circuit 32*b* converts the electric signal into a parallel digital image signal.

Since the decoding circuit 52 performs decoding, the parallel digital image signal converted in the serial/parallel conversion circuit 32*b* is an equivalent signal to the parallel digital image signal in the transmission section 10.

In the clock data recovery circuit 32*a*, in comparison of the timing of a code change of the input (received) serial digital image signal, the clock signal CLKout for carrying is extracted. Thereby, when the same code succeeds in the serial digital image signal, the opportunity of timing comparison of the code change decreases and the accuracy of the extracted clock is lowered.

However, since in the transmission section 10, the serial digital image signal is encoded by the encoding circuit 51 and at that time, encoding is performed such that the same code, or '0' or '1' does not extremely succeed and the numerical balance between different codes, or a mark ratio, is nearly 50%, the electric signal input into the clock data recovery circuit 32*a* is a signal of which the succession of the same code is restrained.

Thereby, in the clock signal recovery circuit 32*a*, since ample opportunity for timing comparison of the code change can be obtained, the extraction accuracy of the clock signal CLKin for carrying can be improved.

Succession of the same code of digital signals and a biased numerical balance might cause the occurrence of jitter since the DC balance in the optical reception section 31 of the reception section 30 is lost but, as described above, by encoding, the occurrence of jitter can be also reduced.

In this case, it is preferable that the multiplier 'K' of the clock generating circuit 11*b* for carrying is set according to the length of the serial digital image signal after encoding.

In the second embodiment, as shown in FIGS. 8 and 9, a case in which the serial digital signal converted by the parallel/serial conversion circuit 11*a* is encoded and that the serial digital reception signal adjusted in timing by the clock data recovery circuit 32*a* is decoded is described, but the invention should not be limited to such a case.

Figure 10:
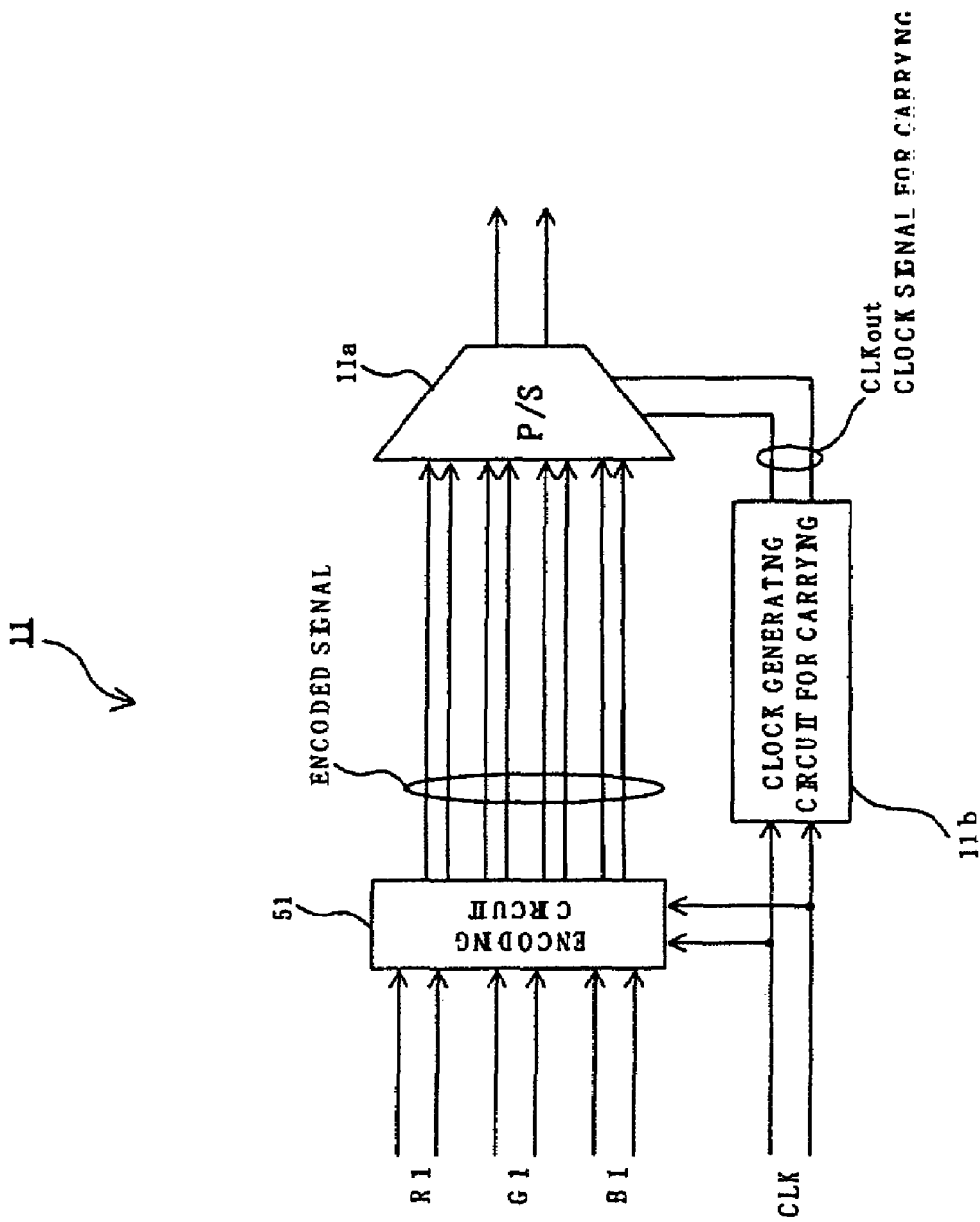
FIG. 10 shows a block diagram illustrating another example of a multiplexer in the second embodiment.
Figure 11:
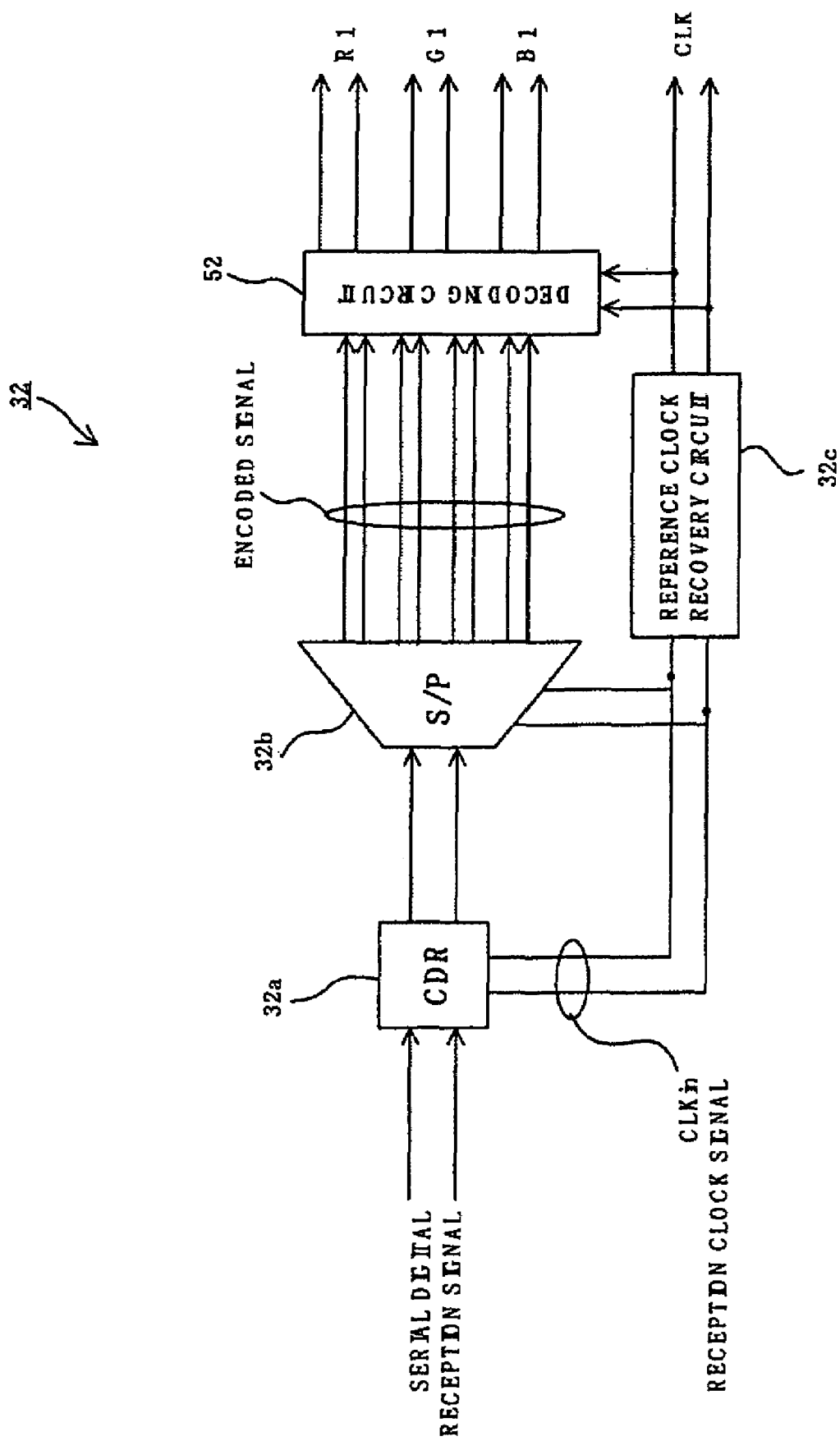
FIG. 11 shows a block diagram illustrating another example of a multiplexer in the second embodiment.

For example, as shown in FIGS. 10 and 11, it is preferable that in the multiplexer 11 of the transmission section 10, the parallel digital image signal output from the digital image output equipment 101 is encoded in an encoding circuit 51' operated according to the reference clock signal CLK and then converted into a serial digital image signal by a parallel/serial conversion circuit 11*a*, and that in the demultiplexer 32 of the reception section 30, the parallel digital image signal is converted into a parallel digital reception signal by the serial/parallel conversion circuit 32*b*, and then decoded by the decoding circuit 52' operated according to the clock signal corresponding to the reference clock signal CLK recovered by the reference clock recovery circuit 32*c*. In this case, it is also preferable that the encoding circuit 51' and the decoding circuit 52' perform a process at the time of encoding and decoding by the encoding circuit 51 and the decoding circuit 52.

Thus, when the parallel digital signal is encoded and encoded, since circuit operations of the encoding circuit 51' and the decoding circuit 52' can be slower in comparison to encoding and decoding the serial digital signal, the encoding circuit 51' and the decoding circuit 52' can be simply structured.

Next, a third embodiment according to the present invention is described.

Since the third embodiment is similar to the first embodiment except for the structures of the transmission section 10 and the reception section 30, identical reference numerals are given to identical parts, and a detailed description is omitted.

Figure 12:
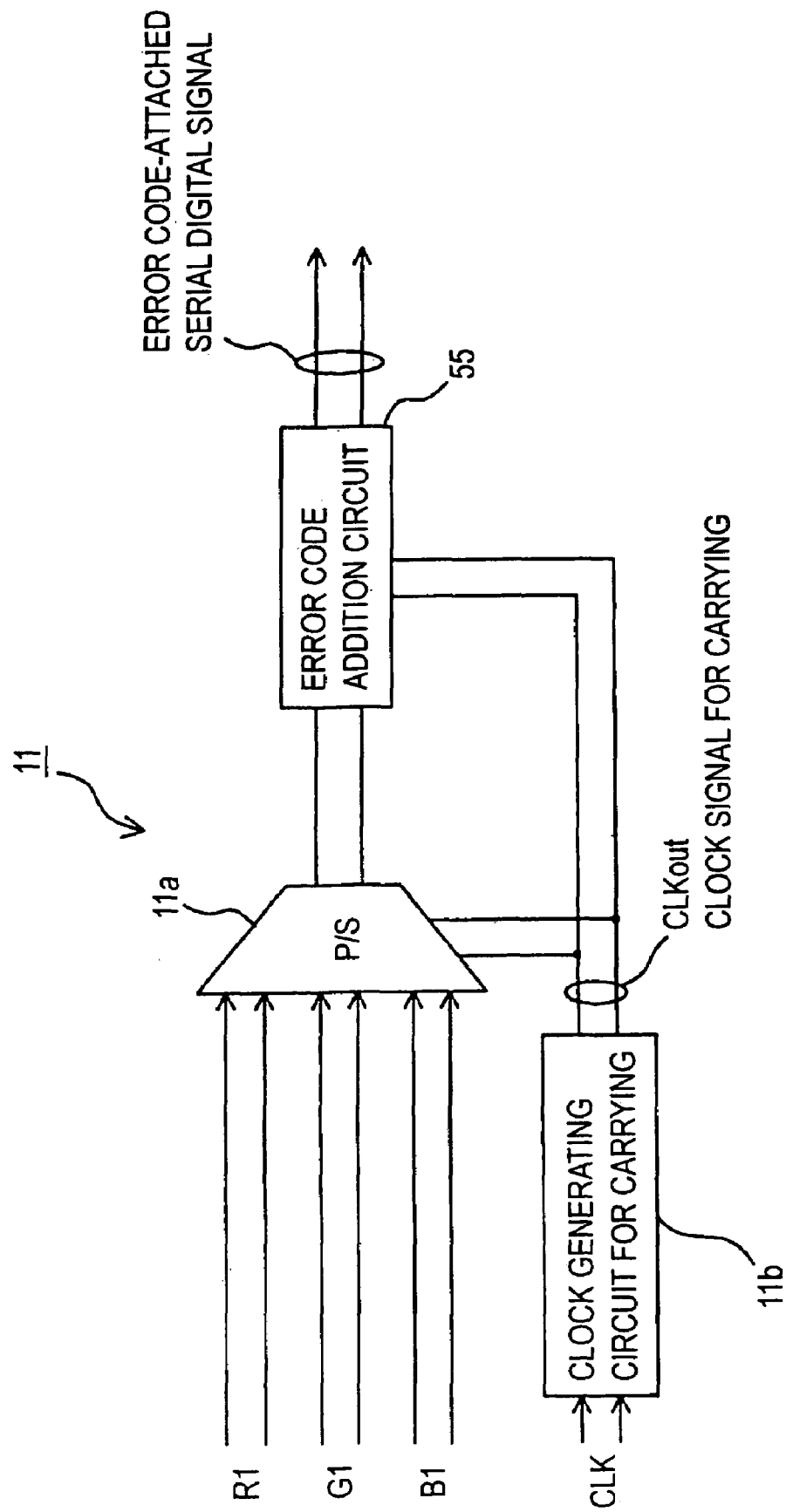
FIG. 12 shows a block diagram illustrating one example of a multiplexer in the third embodiment.

In the third embodiment, a multiplexer 11 of a transmission section 10 comprises, as shown in FIG. 12 and similar to the first embodiment, a parallel/serial conversion circuit 11*a* receiving RGB image signals in parallel and converting the RGB image signals into a serial digital signal on the basis of a clock signal "CLKout for carrying", a "clock generating circuit 11*b* for carrying" generating the clock signal CLKout for carrying by multiplying a reference clock signal CLK by a predetermined number, and an error code addition circuit 55 adding an error code (bit for checking) to a serial digital image signal converted by the parallel/serial conversion circuit 11*a*.

Figure 13:
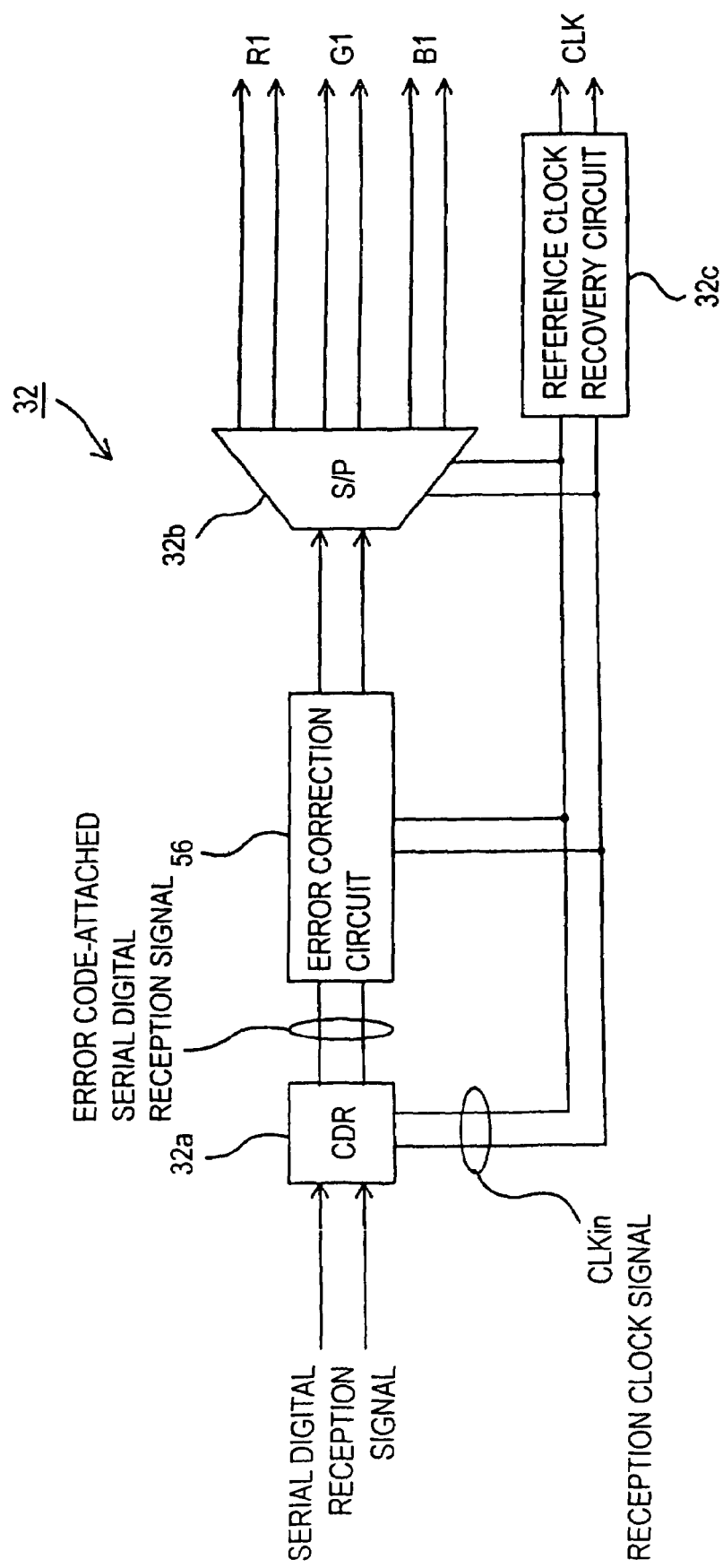
FIG. 13 shows a block diagram illustrating one example of a demultiplexer in the third embodiment.

A demultiplexer 32 of a reception section 30 comprises, as shown in FIG. 13 and similar to the first embodiment, a clock data recovery circuit (CDR) 32*a* extracting a reception clock signal CLKin corresponding to the clock signal CLKout for carrying from the serial digital reception signal converted into an electric signal, a serial/parallel conversion circuit (S/P) 32b converting the serial digital reception signal into a parallel digital reception signal using the reception clock signal CLKin, and a reference clock recovery circuit 32c recovering a signal corresponding to the reference clock signal CLK from the reception clock signal CLKin and further comprises an error correction circuit 56 between the clock data recovery circuit (CDR) 32a and the serial/parallel conversion circuit 32b.

Figure 14:
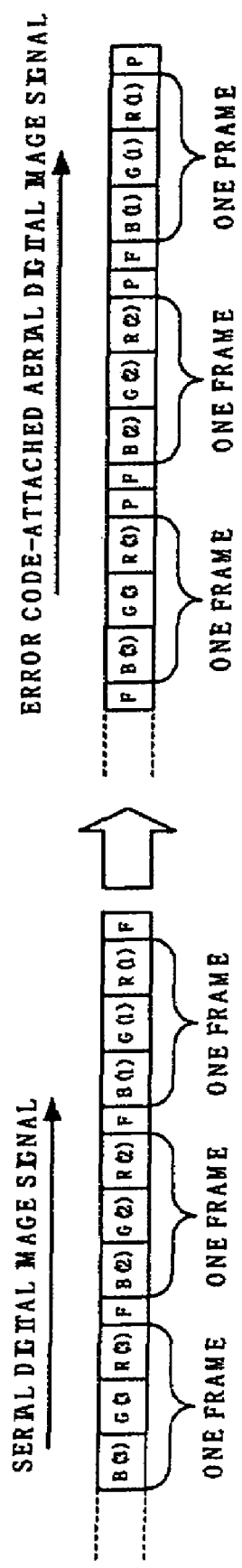
FIG. 14 shows an explanatory drawing for describing operation of an error code addition circuit in FIG. 12.

The error code addition circuit 55 inputs the clock signal CLKout for carrying as a signal required for circuit operation and adds a bit for checking comprising an error code permitting error detection and its correction to the serial digital image signal. For example, as shown in FIG. 14, the bit P for checking is configured to the serial digital image signal for one frame of data of control bit F and RGB image signal and added after the next one frame data of RGB image signal.

Meanwhile, the error correction circuit 56 inputs the reception clock signal CLKin as a signal for circuit operation and detects an error for the serial digital reception signal to which the error code is added on the basis of the bit P for checking, and when an error is detected, it is corrected.

Accordingly, in the third embodiment, the serial digital image signal converted by the serial/parallel conversion circuit 11a of the multiplexer 11 of the transmission section 10 is converted into an optical signal for transmitting in an optical transmission section 12 after adding the bit P for checking for error detection in the error code addition circuit 55.

In the reception section 30, an optical reception section 31 converts the optical signal into an electric signal and the clock data recovery circuit 32a of the demultiplexer 32 corrects the timing, and then the error code correction circuit 56 performs error detection and error correction on the basis of the bit P for checking and the serial/parallel conversion circuit 32b converts the electric signal into a parallel digital reception signal. Then, the parallel digital reception signal is output to digital image input equipment 103 as a digital image signal.

Accordingly, even if a communication error such as a code error occurs in the communication process, error correction is performed by the error correction circuit 56 and the occurrence of phenomena such as lowering of image quality or impossibility of display due to the communication error can be prevented.

The transmission section 10 and the reception section 30 are connected by a DVI standard communication interface. Here, in the DVI and HDMI standards, the TMDS type is used as the communication type for image information but an error code is not included in the TMDS type.

However, as described above, since the bit for checking is added in the error code addition circuit 55 for error detection, and error detection and its correction are performed in the error correction circuit 56 on the basis of the bit for checking, even when an error code is not included in a communication signal, error detection can be properly performed and the occurrence of phenomena such as lowering of image quality or impossibility of display due to the transmission error can be prevented.

When an extremely fine digital image signal is communicated, the digital image signal is communicated with high frequency and accordingly, the possibility of communication error increases, however, since the error correction is performed as described above, the quality can be maintained even when communicating an extremely fine digital image signal.

In this case, it is preferable that the multiplier 'K' of the reference clock signal CLK in the clock generating circuit 11b for carrying is set according to the length of serial digital image signal including the bit for checking.

The third embodiment described a case wherein the transmission section 10 adds an error code to the serial digital image signal converted in the parallel/serial conversion circuit 11a by the error code addition circuit 55 and the reception section 30 detects and corrects an error for the serial digital reception signal to which the error code corrected in timing in the clock data recovery circuit 31a is added by the error correction circuit 56. However, it should not be so limited.

Figure 15:
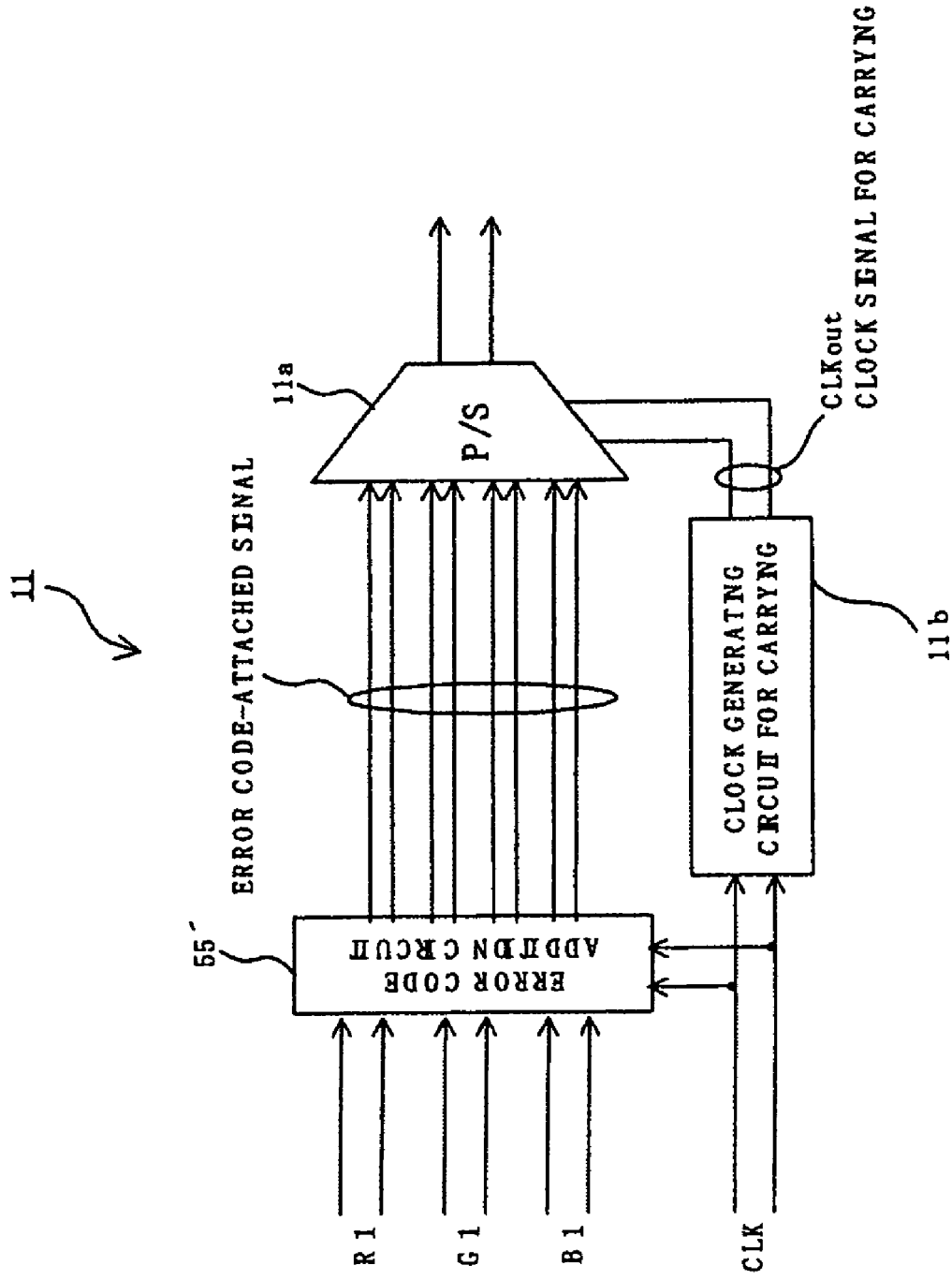
FIG. 15 shows a block diagram illustrating another example of a multiplexer in the third embodiment.
Figure 16:
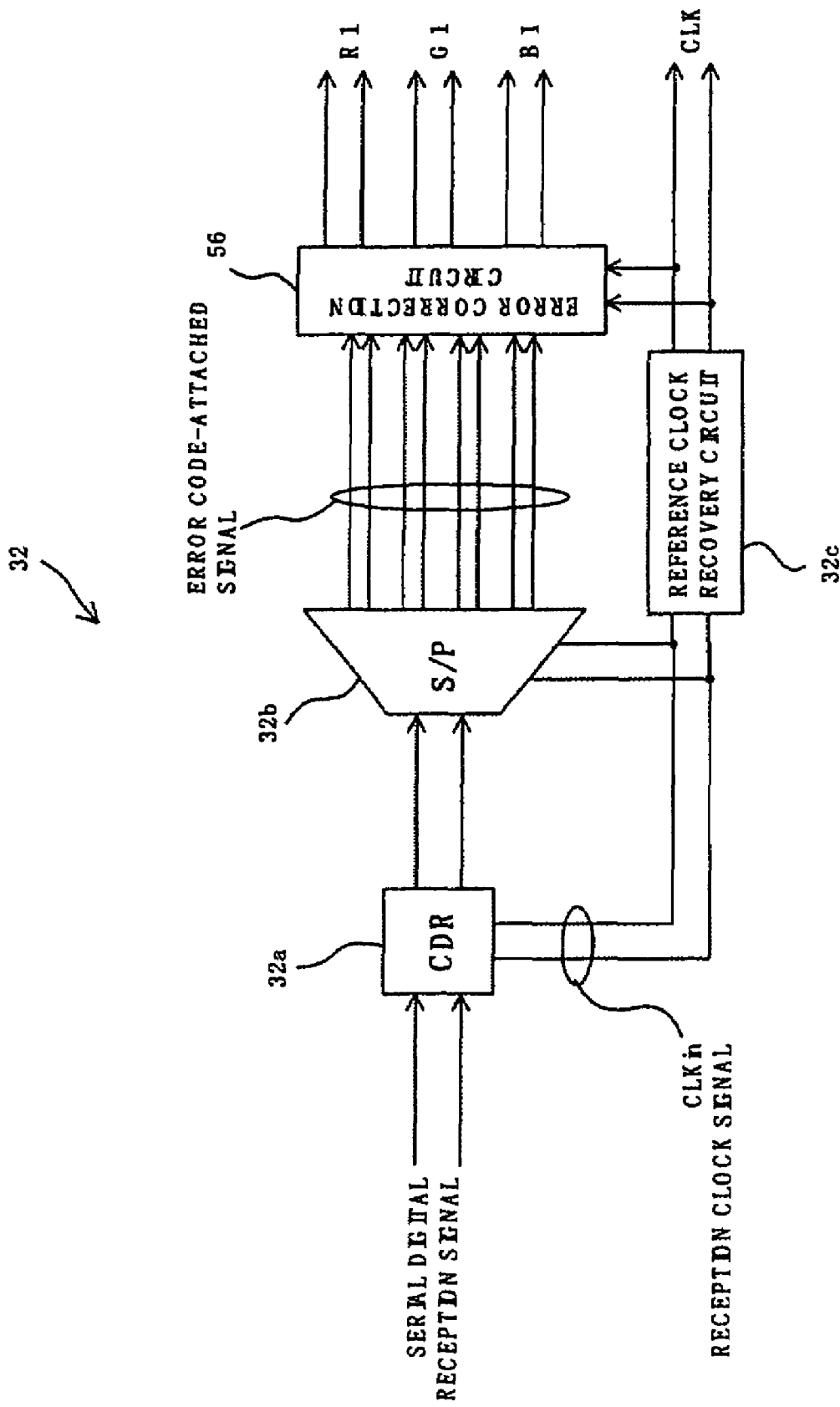
FIG. 16 shows a block diagram illustrating another example of a demultiplexer in the third embodiment.

For example, as shown in FIGS. 15 and 16, it is preferable that in the multiplexer 11 of the transmission section 10, an error code is added to the parallel digital image signal by an error code addition circuit 55' operated according to the reference clock signal CLK and then converted into a serial digital image signal by a parallel/serial conversion circuit 11a, and that in the demultiplexer 32 of the reception section 30, the parallel digital image signal is converted into a parallel digital reception signal by the serial/parallel conversion circuit 32b, and then error detection and its correction are performed on the parallel digital image signal by an error correction circuit 56' operated according to a signal corresponding to the reference clock signal CLKin recovered by the reference clock recovery circuit 32c.

Thus, with the addition of an error detection code, error detection and its correction are performed on the parallel digital signal, since circuit operations of the error code addition circuit 55' and the error correction circuit 56' can be slower in comparison to performing error detection on the serial digital signal, the error code addition circuit 55' and the error correction circuit 56' can be simply structured.

It is also preferable in the third embodiment that encoding is performed by combining with the second embodiment.

Figure 17:
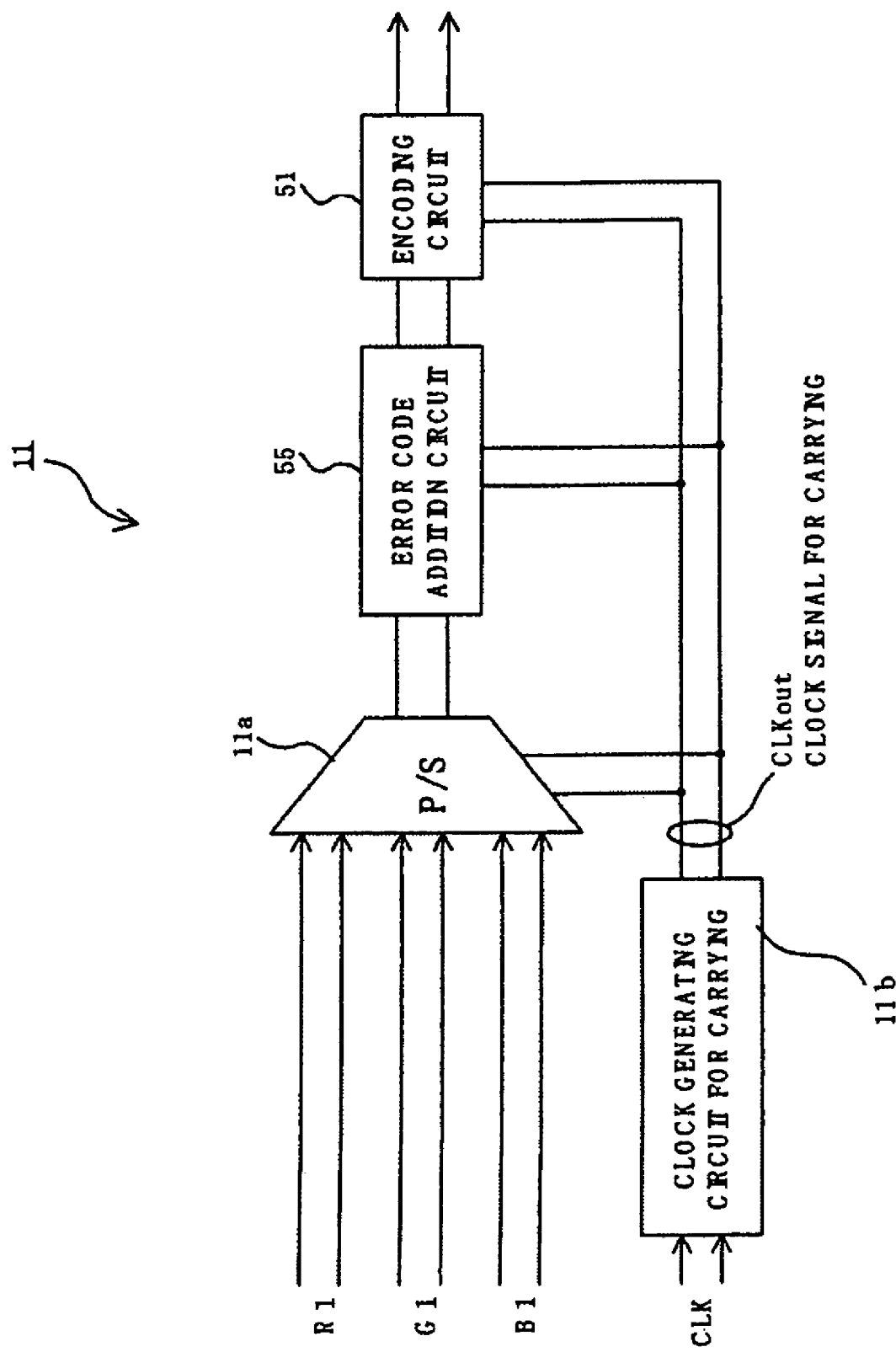
FIG. 17 shows a block diagram illustrating another example of a multiplexer in the third embodiment.
Figure 18:
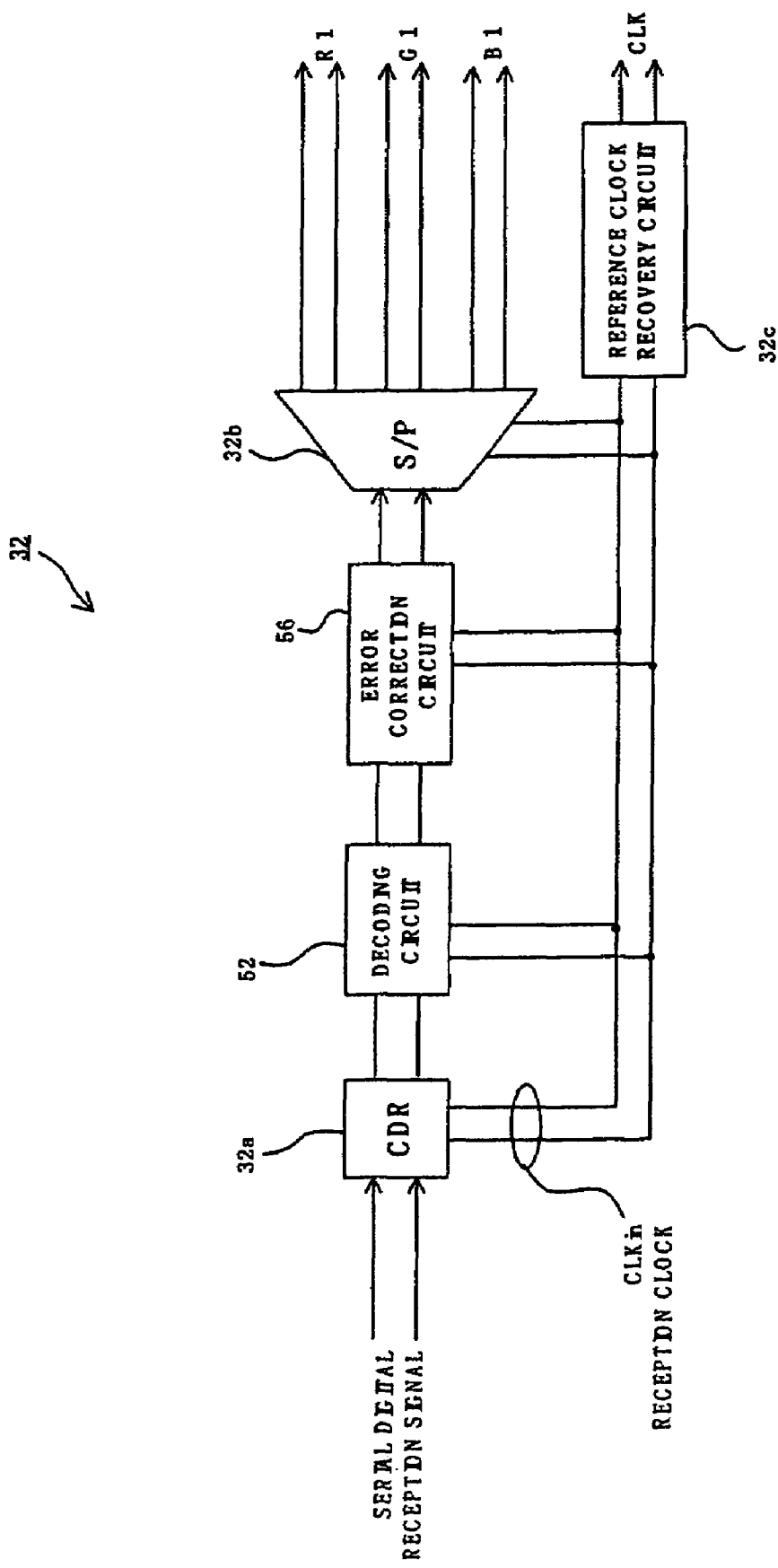
FIG. 18 shows a block diagram illustrating another example of a demultiplexer in the third embodiment.

That is, as shown in FIG. 17, an encoding circuit 51 is added to the output side of the error code addition circuit 55 as shown in FIG. 12, and as shown in FIG. 18, a decoding circuit 52 is interposed between the clock data recovery circuit 32a and the error correction circuit 56 as shown in FIG. 13.

The transmission section 10 adds a bit P for checking for error correction to the serial digital image signal in the error code addition circuit 55, and then the serial digital image signal is encoded by the encoding circuit 51 and converted into an optical signal for transmitting.

Meanwhile, in the reception section 30, the serial digital reception signal adjusted in timing in the clock data recovery circuit 32a is decoded by the decoding circuit 52, and then error detection and its correction are performed by the error correction circuit 56. The serial digital reception signal is converted into a parallel signal by the serial/parallel circuit 32b, and the parallel digital reception signal recovered as equivalent as the digital image signal output from the digital image output equipment 101 is output to the digital image input equipment 103.

Thereby, an equivalent effect to the second and third embodiments can be obtained.

Figure 19:
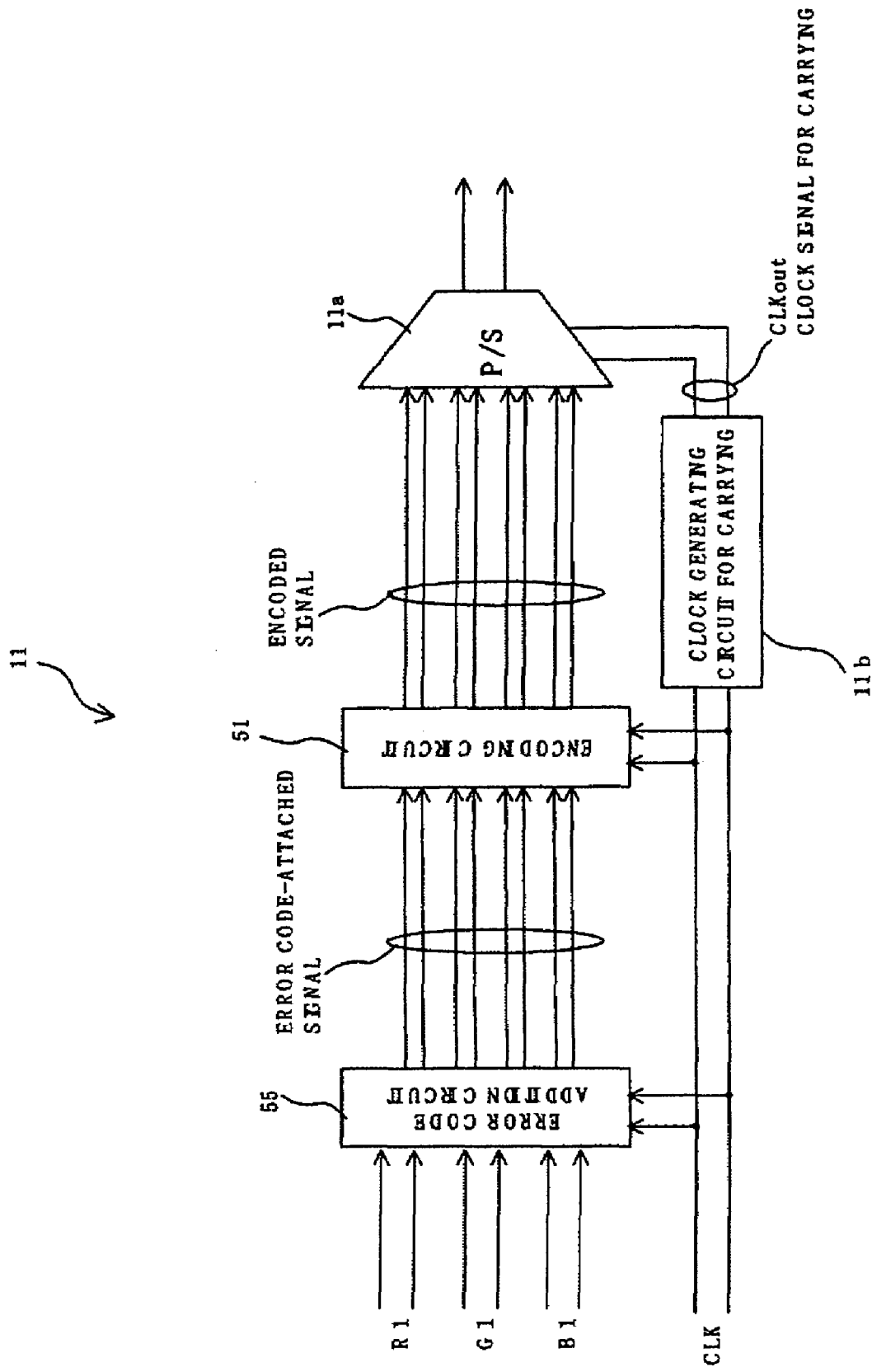
FIG. 19 shows a block diagram illustrating another example of a multiplexer in the third embodiment.
Figure 20:
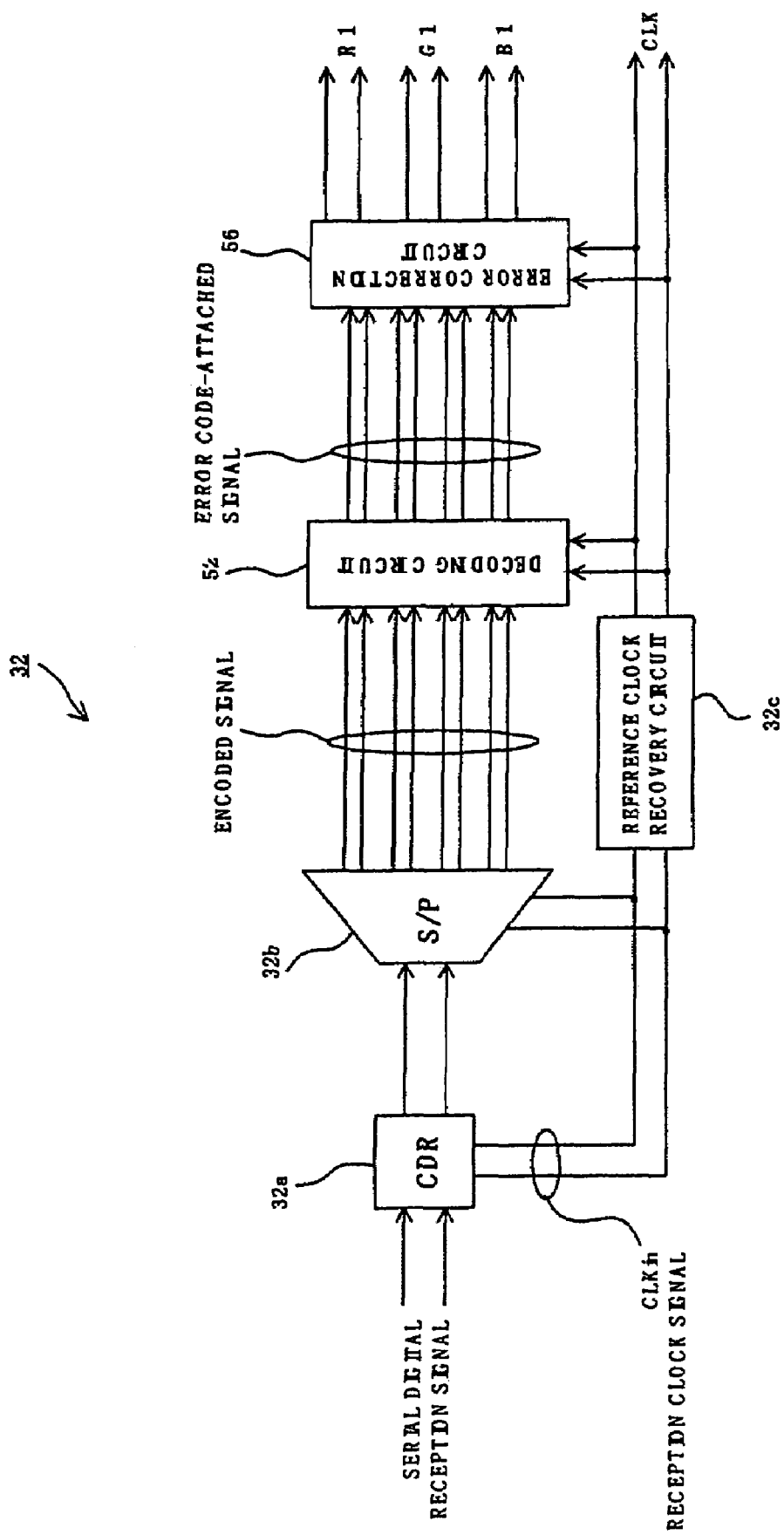
FIG. 20 shows a block diagram illustrating another example of a demultiplexer in the third embodiment.

Also in this case, it is preferable that, as shown in FIGS. 19 and 20, on the transmission section 10 side, error detection, encoding and serial conversion are performed on the digital image signal in the order of the error code addition circuit 55', the encoding circuit 51' and the parallel/serial conversion circuit 11a, and that on the reception section 30 side, parallel conversion, decoding and error correction are performed on the received serial digital reception signal in the order of the serial/parallel conversion circuit 32b, the decoding circuit 52' and the error correction circuit 56', and decoding and error detection on the parallel signal are performed.

Also in this case, since circuit operations of the encoding circuit 51', the decoding circuit 52', the error code addition circuit 55' and the error correction circuit 56' can be slower, these circuits can be simply structured.

It is preferable that in FIG. 17, a bit P for checking is added to the serial digital image signal by the error code addition circuit 55 after encoding by the encoding circuit 51 for transmitting, and that in FIG. 18, the serial digital image signal is decoded by the decoding circuit 52 after error detection by the error correction circuit 56. Similarly, in FIGS. 19 and 20, encoding and error detection can be performed in the reverse order.

In the second and third embodiments, a case adapted to the TMDS1 link type digital image transmission system is described. Also in this case, as shown in FIG. 5, the invention can be adapted to the TMDS2 link type digital image transmission system having two sets of R, G and B and it is preferable that as shown in FIG. 6, a parallel/serial conversion circuit 11a' capable of converting two sets of RGB image signals into serial signals as a parallel/serial conversion circuit of the transmission section 10 is used and that as shown in FIG. 7, a serial/parallel conversion circuit 32b' capable of converting the serial signal into a parallel signal of two sets of RGB image signals as a serial/parallel conversion circuit is used.

Although the respective embodiments described a case wherein the transmission section 10 and the reception section 30 are prepared independently from the digital image output equipment 101 and the digital image input equipment 103, the invention should not be so limited. It is preferable that the transmission section 10 is assembled in the digital image output equipment 101 and similarly that the reception section 30 is assembled in the digital image input equipment 103.

Next, a fourth embodiment according to the present invention is described.

Since the fourth embodiment is similar to the first to third embodiments except that the structures of the transmission section 10' and the reception section 30' are respectively different from the transmission section 10 and the reception section 30, identical reference numerals are given to identical parts, and a detailed description is omitted.

Figure 21:
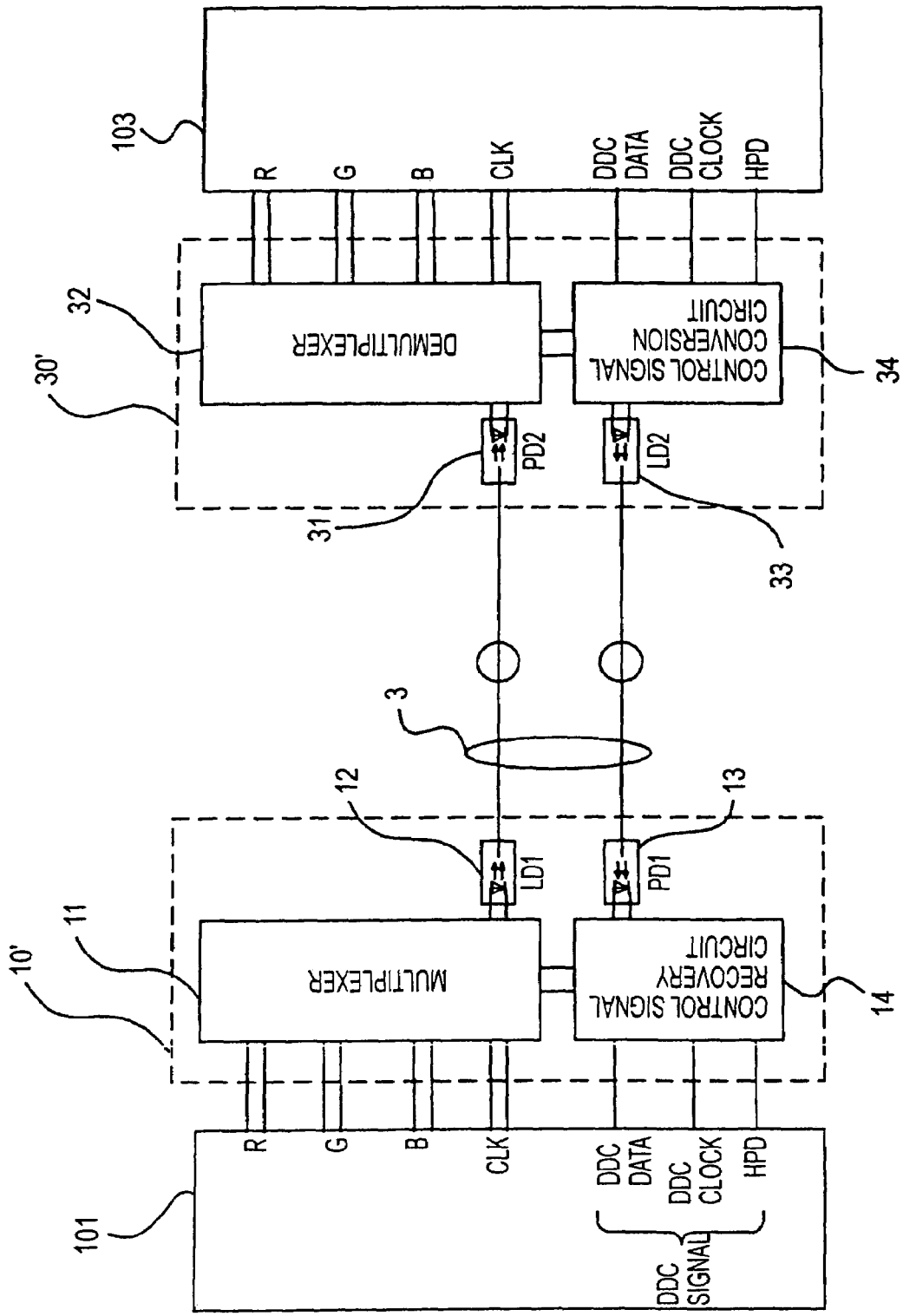
FIG. 21 shows an outline block diagram illustrating one example of a digital image communication device in the fourth embodiment.

FIG. 21 shows an outline block diagram illustrating an example of a digital image transmission device according to the fourth embodiment.

Differences of the fourth embodiment from the first embodiment are described as follows. Although in the first to third embodiments, a receiver control signal is transmitted via metal wiring 4, in the fourth embodiment, as shown in FIG. 21, a reception section 30' and a transmission section 10' are connected by two fiber optic cables 3. In the reception section 30', there are a control signal conversion circuit 34, converting the receiver control signal into a receiver control serial signal using the reception clock signal CLKin extracted from the serial digital reception signal converted into an electric signal in the demultiplexer 32, and a second optical section 33 comprising a laser diode and a laser driver which converts the receiver control serial signal into an optical signal 2 and transmits the optical signal via a fiber optic cable 3. In the transmission section 10', there are a second optical reception section 10', comprising a photodiode and a PD amplifier for receiving an optical signal 2 from a fiber optic cable 3 and converting the optical signal into a receiver control serial reception signal, and a control signal recovery circuit 14 recovering a receiver control signal from the receiver control serial reception signal using the clock signal CLKout for carrying generated in the multiplexer 11.

Though a cable in which one fiber optic cable and four lead wires are made coaxial is not available in the market, in a general optical high speed transmission device such as a ⅒ Gigabit Ethernet, SONET, etc. a cable in which a set of two fiber optic cables is made coaxial for transmission and reception is often used, and in the fourth embodiment, such a cable in which a set of two fiber optic cables is made coaxial can be easily used.

Next, a fifth embodiment according to the present invention is described.

Since the fifth embodiment is similar to the fourth embodiment except for the structures of the transmission section 10', the reception section 30' and the fiber optic cable 2, identical reference numerals are given to identical parts, and a detailed description is omitted.

Figure 22:
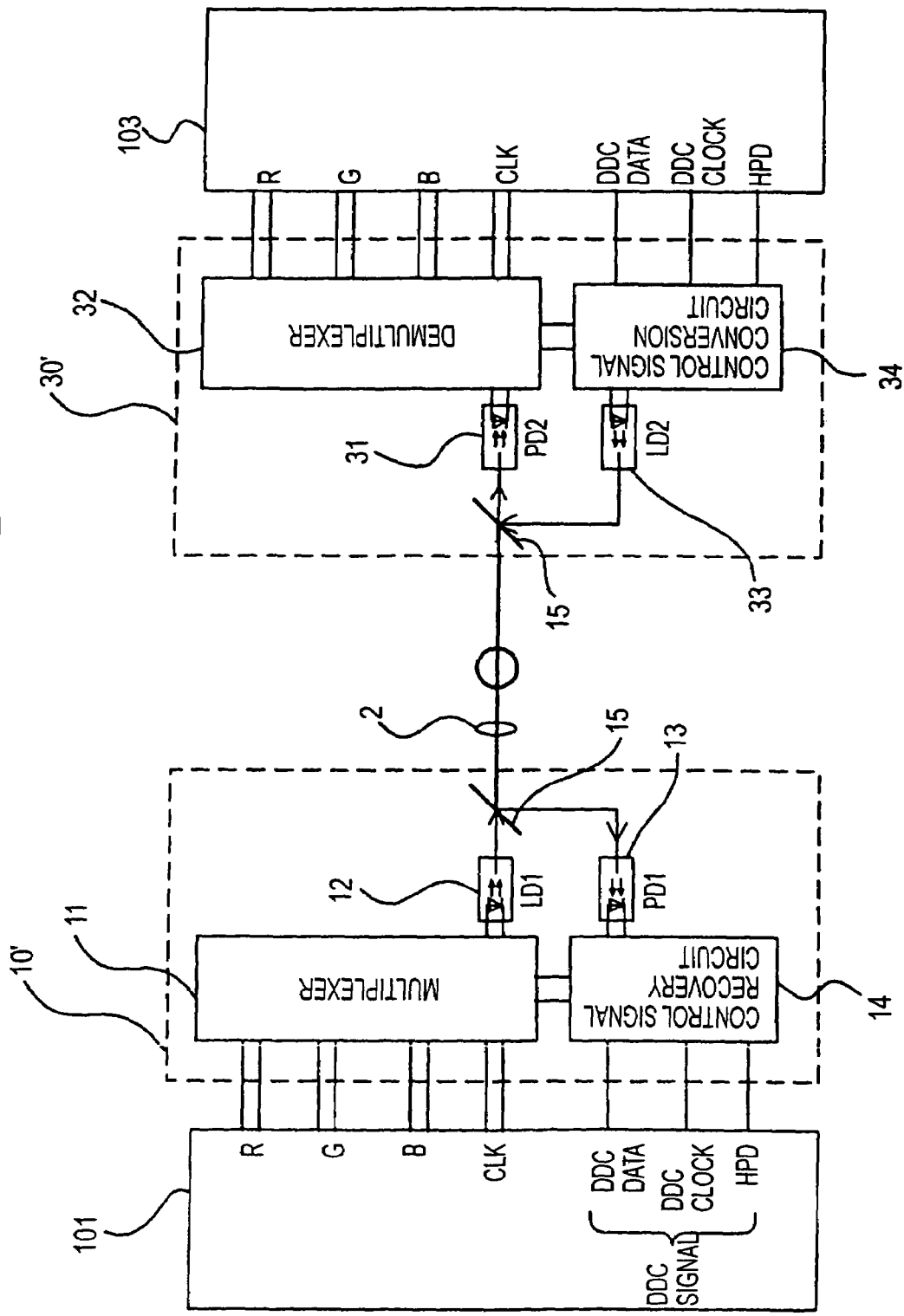
FIG. 22 shows an outline block diagram illustrating one example of a digital image communication device in the fifth embodiment.

FIG. 22 shows an outline block diagram illustrating an example of a digital image transmission device according to the fifth embodiment.

Differences of the fifth embodiment from the fourth embodiment are as follows. Though in the fourth embodiment, digital image signals and receiver control signals are communicated between the transmission section 10' and the reception section 30' via a set of two fiber optic cables, in the fifth embodiment, in the transmission section 10', optical signal paths of the optical transmission section 12 and the second optical reception section 13 are joined by a half mirror. Also, in the reception section 30', optical signal paths of the optical reception section 31 and the second optical transmission section 33 are joined by a half mirror and the transmission section 10' and the reception section 30' are connected by one fiber optic cable 2.

Figure 23:
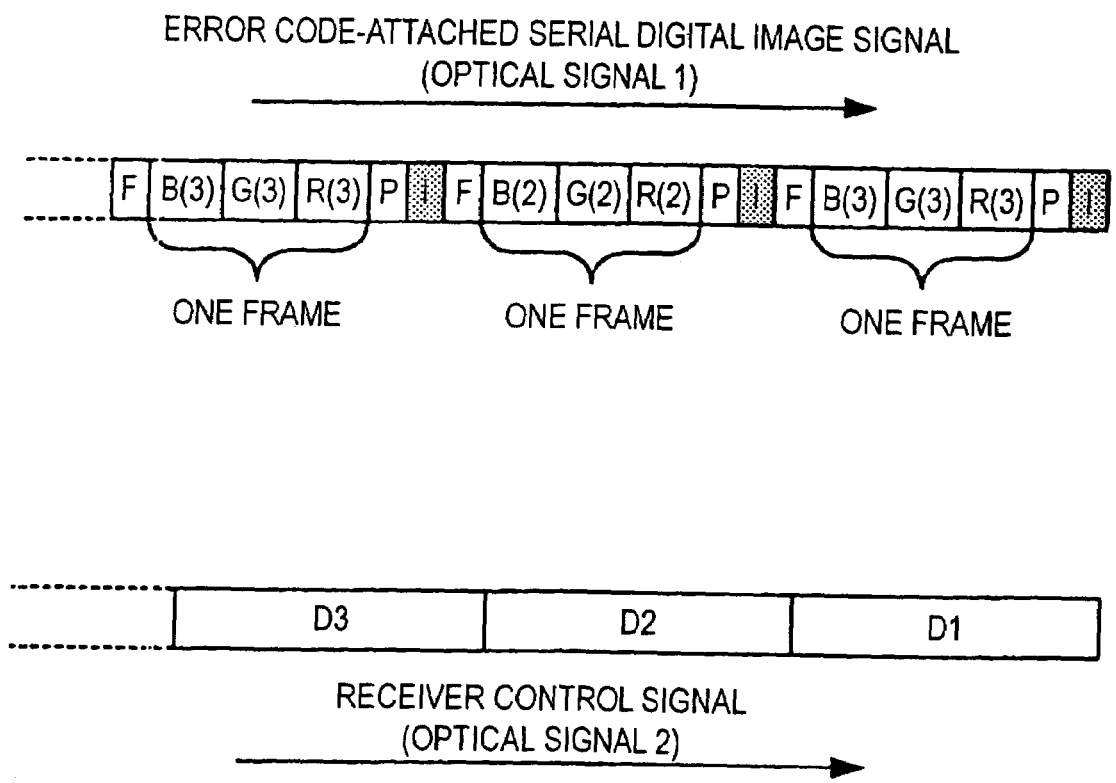
FIG. 23 shows an explanatory drawing for describing an operation outline in the fifth embodiment.

In the above arrangement, the optical signal 1 converted from the serial digital image signal and the optical signal 2 converted from the receiver control serial signal can be transmitted/received via one fiber optic cable 2. The optical signal 1 and the optical signal 2 are transmitted at optional timing of transmitting and receiving (communicating) as shown in FIG. 23. There exists the potential problem that the transmission error rate is high since the optical reception means 1 and the optical reception means 2 interfere with each other when the optical signals 1 and 2 have the same wavelengths. However, since the optical signals 1 and 2 have different wavelengths from each other, the optical reception means 1 and the optical reception means 2 can lower interference effect and the transmission error rate is not high.

Next, a sixth embodiment according to the present invention is described.

Figure 24:
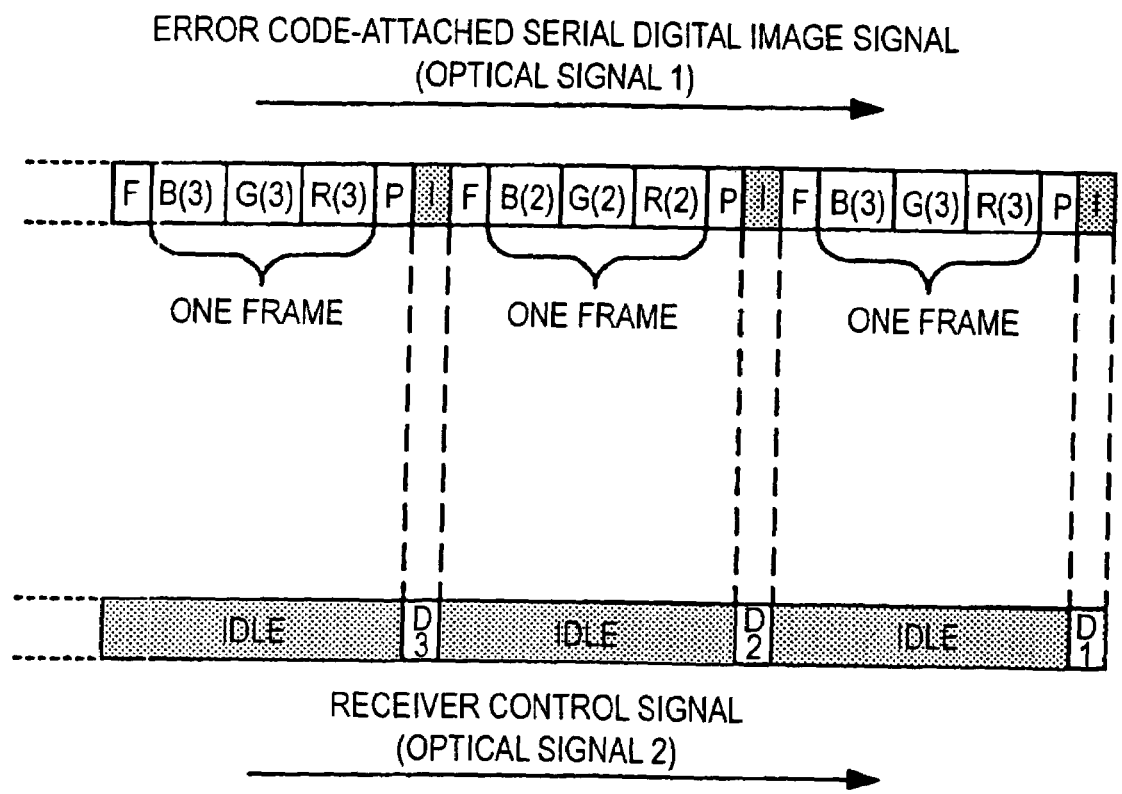
FIG. 24 shows an explanatory drawing for describing an operation outline in the sixth embodiment.
Figure 25:
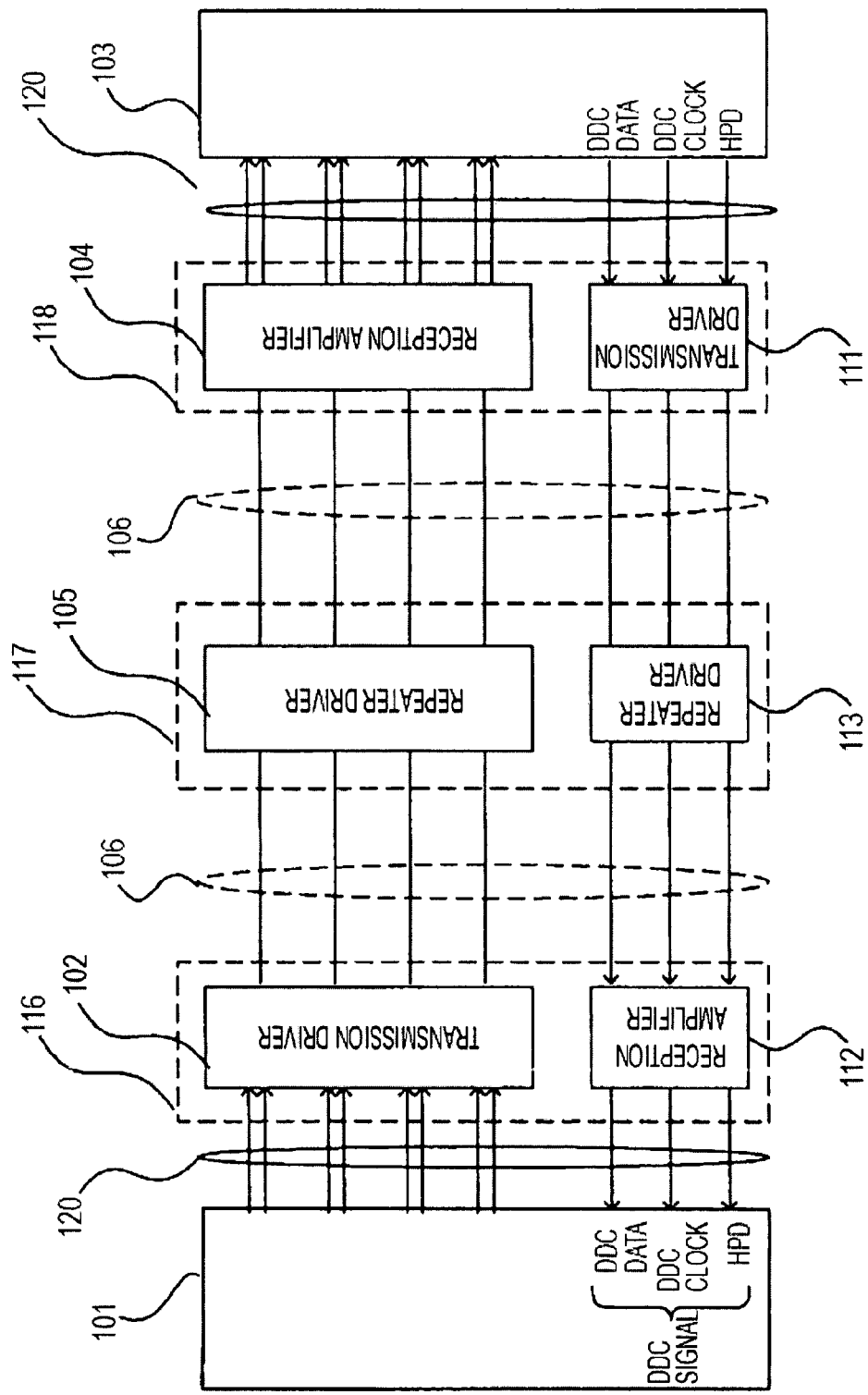
FIG. 25 is an outline block diagram illustrating an example of a conventional digital image communication device.
Figure 26:
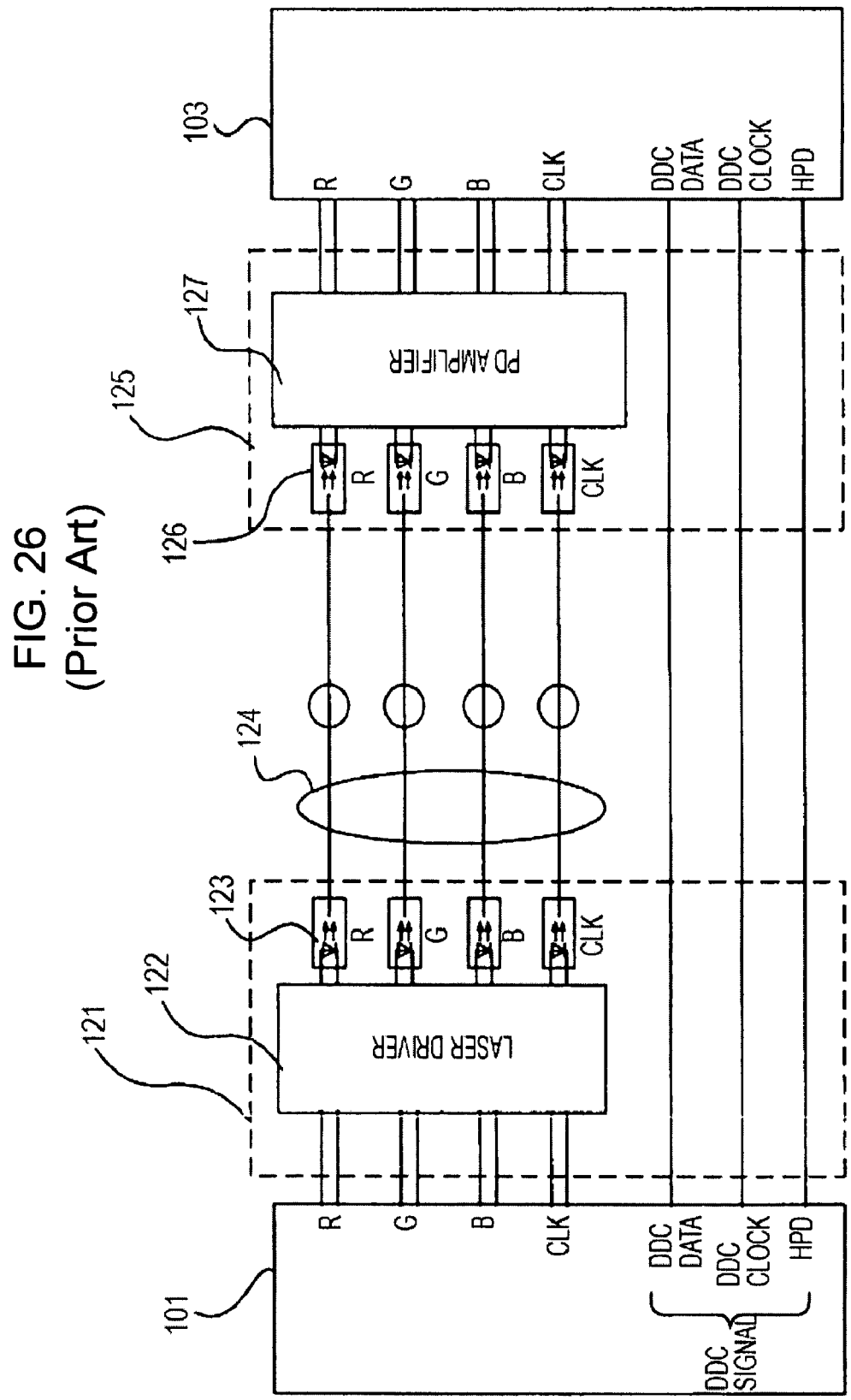
FIG. 26 is an outline block diagram illustrating another example of a conventional digital image communication device.
Figure 27:
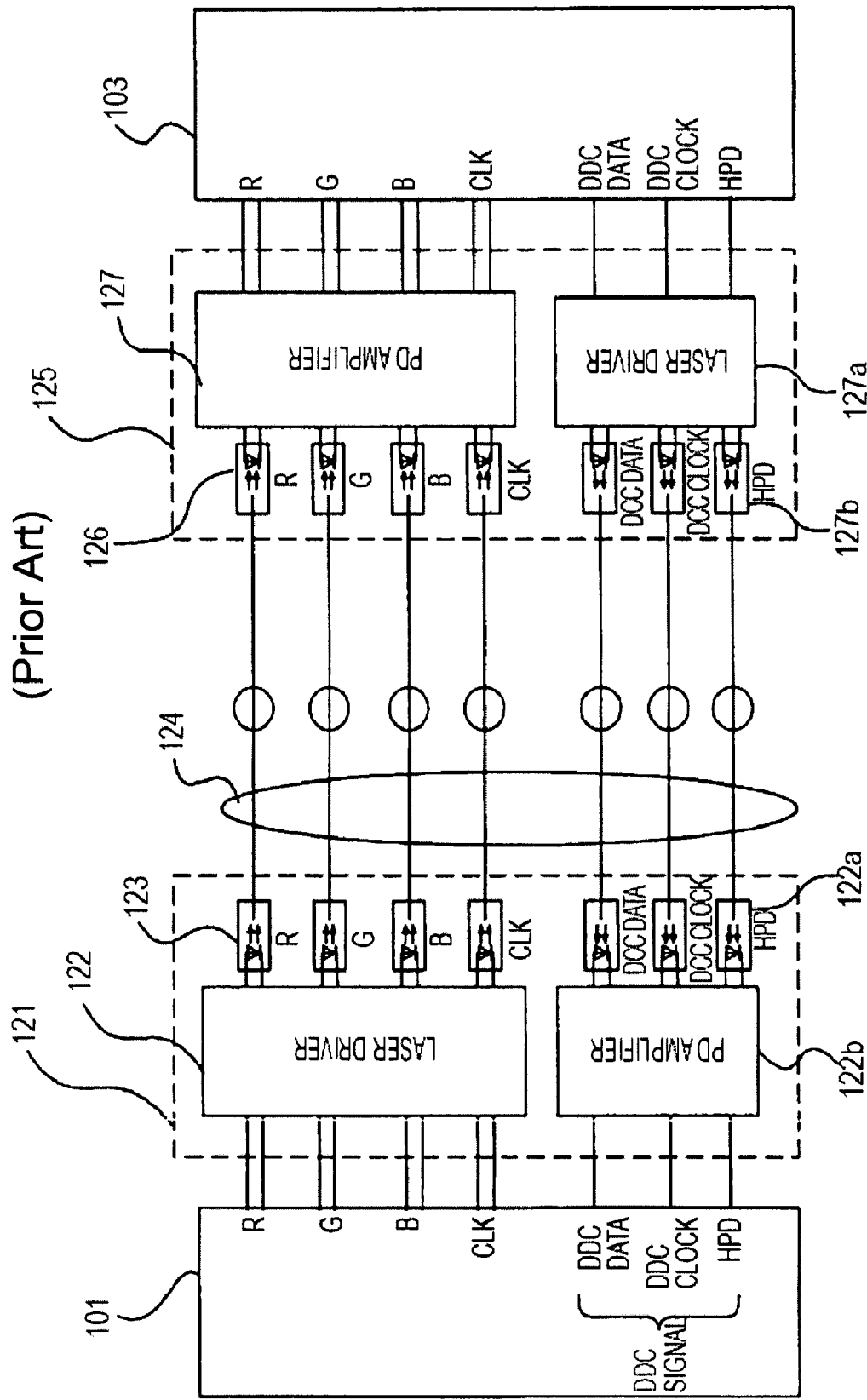
FIG. 27 is an outline block diagram illustrating another example of a conventional digital image communication device.

Though in the sixth embodiment, a similar arrangement to the outline block diagram illustrating one example of a digital image transmission device according to the fifth embodiment, as the transmission timing of the optical signals 1 and 2 communicated using the fiber optic cables 2 is shown in FIG. 24, the difference is that the second optical transmission section 33 is in a dormant state when the optical transmission section 12 transmits the optical signal 1, that the optical transmission section 12 is in a dormant state when the second optical transmission section 33 transmits the optical signal 2 and that these are periodically repeated.

That is, since the optical signals 1 and 2 are not in a transmission state at the same time and the optical reception means 1 and the optical reception means 2 are prevented from interfering, the transmission error rate is not high. Since the optical signals 1 and 2 have the same wavelength, the optical transmission section 12 and the second optical transmission section 33 and also the optical reception section 31 and the second optical reception section 13 can have similar component structures, and thereby costs can be reduced.

Although in each of the above embodiments, a case is described wherein the digital image output equipment 101 and the transmission section 10, and the digital image input equipment 103 and the reception section 30 are respectively connected by coaxial cables 1, it is also preferable that the transmission section 10 and the reception section 30 are connected by a fiber optic cable and that connector sections complying with the DVI standard are respectively prepared to the transmission section 10 and the reception section 30 to structure an interface module and the connector complying with the DVI standard of the transmission section 10 and the reception section 30 and the connector section complying with the DVI standard of the digital image output equipment 101 and the digital image input equipment 103 are directly connected.

Although the respective embodiments described a case wherein a digital image is communicated using a DDC signal, the invention should not be so limited. It is also preferable that the digital image is communicated without the DDC signal.

Also, although the respective embodiments described a case wherein an image signal is communicated in the TMDS type by the DVI standard interface, the invention should not be so limited. The invention can be adapted if the RGB image signal and the reference clock signal CLK are communicated, and for example, when they are communicated via an SDI standard interface.

Although the respective embodiments described a case wherein a digital image signal is communicated between the digital image output equipment 101 such as a computer, etc. and the digital image input equipment 103 such as a display device, etc., the invention should not be so limited. The invention can be adapted to, for example, a case wherein a digital image is communicated between an image pickup device such as a digital camera as the digital image output device 101 and a display device, etc. as the digital image input equipment 103, that is, it can be adapted to a case with an equipment outputting digital image signals and equipment inputting digital image signals.

In the respective embodiments, the transmission section 10 corresponds to a digital image transmission device, the reception section 30 to a digital image reception device, the clock generating circuit 11b for carrying to clock generating means for carrying, the parallel/serial conversion circuit 11a to parallel/serial conversion means, the optical transmission section 12 to optical signal transmission means, the optical reception section 31 to optical signal reception means, the clock data recovery circuit 32a to clock signal extracting means, the serial/parallel conversion circuit 32b to serial/parallel conversion means, the reference clock recovery circuit 32c to reference clock recovery means, the encoding circuits 51 and 51' to encoding means, the decoding circuits 52 and 52' to coding/decoding means, the error code addition circuits 55, 55' to error code addition means, and the error correction circuits 56 and 56' to error detection means.

What is claimed is:

1. A method for communicating a digital image signal including a parallel digital image signal and a reference clock signal, the parallel digital image signal having at least corresponding image signals of RGB, the method comprising:

with a transmitter of the digital image signal,
generating a clock signal based on the reference clock signal,
converting the parallel digital image signal into a serial digital image signal using the clock signal, and
converting the serial digital image signal into an optical signal for transmitting;

with a receiver of the digital image signal,
receiving the optical signal from the transmitter,
converting the received optical signal into a serial digital reception signal including electric signals,
extracting a clock extraction signal corresponding to the clock signal from the serial digital reception signal,
recovering the parallel digital image signal from the serial digital reception signal using the clock extraction signal,
recovering the reference clock signal from the clock extraction signal,
converting a receiver control signal including a control signal of at least one system of the receiver into a receiver control serial signal using the clock extraction signal, and
converting the receiver control serial signal into a second optical signal for transmitting;

with the transmitter,
receiving the second optical signal from the receiver,
converting the received second optical signal into the receiver control serial signal including electric signals, and
recovering the receiver control signal from the receiver control serial signal using the clock signal.

2. A digital image communication device comprising:
a digital image transmitter transmitting a digital image signal including a parallel digital image signal and a reference clock signal, the parallel digital image signal having at least corresponding image signals of RGB; and
a digital image receiver receiving the digital image signal from the digital image transmitter;
the digital image transmitter including:
a clock generating circuit that generates a clock signal on the basis of the reference clock signal,
a parallel/serial conversion circuit that converts the parallel digital image signal into a serial digital image signal using the clock signal, and
a first optical signal transmitting circuit that converts the serial digital image signal into a first optical signal and transmits the first optical signal via a cable for optical transmission,
the digital image receiver including:
a first optical signal receiving circuit that receives the first optical signal and converts the first optical signal into a serial digital reception signal including electric signals,
a clock signal extracting circuit that extracts the clock signal from the serial digital reception signal,
a serial/parallel converting circuit that recovers the parallel digital image signal from the serial digital reception signal using the clock extraction signal,
a reference clock recovering circuit that recovers the reference clock signal from the clock extraction signal,
a control signal conversion circuit that converts a receiver control signal of the digital image receiver into a receiver control serial signal using the clock signal, and
a second optical signal transmitting circuit that converts the receiver control serial signal into a second optical signal and transmits the second optical signal via the cable for optical transmission,
the digital image transmitter including:
a second optical signal receiving circuit that receives the second optical signal and converts the second optical signal into a receiver control serial reception signal including electric signals, and a control signal recovering circuit that recovers the receiver control signal from the receiver control serial reception signal using the clock signal.

3. A digital image communication device according to claim 2, the digital image transmitter comprising encoding means for eliminating a code bias of data to be sent to the digital image receiver, and the digital image receiver comprising decoding means adapted to decode the signal encoded by the encoding means into an original signal.

4. A digital image communication device according to claim 2, the digital image transmitter comprising error code addition means for adding a code for error detection to data to be sent to the digital image receiver, and the digital image receiver comprising error detecting means for error detection on the basis of the code for error detection.

5. A digital image communication device according to claim 2, the first optical signal transmitting circuit and the second optical signal receiving circuit joining optical signal paths by a half mirror, the first optical signal receiving circuit and the second optical signal transmitting circuit joining optical signal paths by a half mirror, and the first optical signal and the second optical signal being communicated by a single path of an optical transmission cable.

6. A digital image communication device according to claim 5, the first and second optical signals having different wavelengths from each other.

7. A digital image communication device according to claim 5, the optical signals being transmitted by time-division, the second optical signal is not transmitted or received while the first optical signal is being transmitted or received, and the first optical signal is not transmitted or received while the second optical signal is being transmitted or received.

8. A digital image communication device according to claim 2, the digital image signal including voice data.

9. A digital image communication device according to claim 2, the digital image signal being DVI (Digital Visual Interface) standard compliant.

10. A digital image communication device according to claim 2, the digital image signal being HDMI (High Definition Multimedia Interface) standard compliant.

11. A digital image transmitter transmitting a digital image signal including a parallel digital image signal and a reference clock signal, the parallel digital image signal having at least corresponding image signals of RGB, the digital image transmitter comprising:

a clock generator that generates a clock signal based on the reference clock signal;

a parallel/serial conversion circuit that converts the parallel digital image signal into a serial digital image signal using the clock signal;

an optical signal transmitting circuit that converts the serial digital image signal into a first optical signal for transmitting to a digital image receiver;

an optical signal receiving circuit that receives a second optical signal from the digital image receiver and converts the second optical signal into a receiver serial control reception signal including electric signals; and a control signal recovering circuit that recovers a receiver control signal from the receiver serial control reception signal using the clock signal.

12. A digital image receiver receiving a digital image signal including a parallel digital image signal and a reference clock signal, the parallel digital image signal having at least corresponding image signals of RGB, the digital image receiver comprising:

an optical signal receiver that receives a first optical signal from a digital image transmitter via a cable and that converts the first optical signal into a serial digital reception signal including electric signals;

a clock signal extracting circuit that extracts a clock signal from the serial digital reception signal;

a serial/parallel converting circuit that recovers the parallel digital image signal from the serial digital reception signal using the clock extraction signal;

a control signal conversion circuit that converts a receiver control signal of the digital image receiver into a receiver control serial signal using the dock signal; and a second optical signal transmitting circuit that converts the receiver control serial signal into a second optical signal and transmits the second optical signal via the cable.

* * * * *